United States Patent
Lee et al.

(10) Patent No.: US 10,302,838 B2
(45) Date of Patent: May 28, 2019

(54) LIQUID CRYSTAL DISPLAY HAVING QUANTUM DOT LIGHT GUIDE

(71) Applicant: Samsung Display Co., Ltd, Yongin-si, Gyeonggi-do (KR)

(72) Inventors: Baek Hee Lee, Yongin-si (KR); Young Min Kim, Asan-si (KR); Min Ki Nam, Anseong-si (KR); Kyoung Won Park, Seoul (KR); Hae Il Park, Seoul (KR)

(73) Assignee: Samsung Display Co., Ltd. (KR)

( * ) Notice: Subject to any disclaimer, the term of this patent is extended or adjusted under 35 U.S.C. 154(b) by 82 days.

(21) Appl. No.: 15/349,877

(22) Filed: Nov. 11, 2016

(65) Prior Publication Data
US 2017/0176661 A1    Jun. 22, 2017

(30) Foreign Application Priority Data

Dec. 16, 2015 (KR) .................. 10-2015-0179855

(51) Int. Cl.
| | |
|---|---|
| *G02F 1/1343* | (2006.01) |
| *G02F 1/1368* | (2006.01) |
| *F21V 8/00* | (2006.01) |
| *G02F 1/1335* | (2006.01) |
| *G02F 1/1333* | (2006.01) |

(52) U.S. Cl.
CPC ........... *G02B 6/0026* (2013.01); *G02B 6/005* (2013.01); *G02B 6/009* (2013.01); *G02B 6/0051* (2013.01); *G02F 1/1368* (2013.01); *G02F 1/133377* (2013.01); *G02F 1/133528* (2013.01); *G02F 1/133621* (2013.01); *G02F 1/134336* (2013.01); *G02F 2201/121* (2013.01); *G02F 2201/123* (2013.01); *G02F 2202/36* (2013.01)

(58) Field of Classification Search
None
See application file for complete search history.

(56) References Cited

U.S. PATENT DOCUMENTS

| | | | |
|---|---|---|---|
| 2012/0113672 A1 | 5/2012 | Dubrow et al. | |
| 2015/0331165 A1* | 11/2015 | Ryu | G02B 5/223 362/610 |
| 2015/0378089 A1* | 12/2015 | Oba | G02B 6/0068 349/70 |

FOREIGN PATENT DOCUMENTS

| | | |
|---|---|---|
| JP | 2000-038489 A | 2/2000 |
| KR | 10-2010-0053409 A | 5/2010 |
| KR | 10-2013-0039697 A | 4/2013 |

(Continued)

*Primary Examiner* — Nimeshkumar D Patel
*Assistant Examiner* — Jacob R Stern
(74) *Attorney, Agent, or Firm* — Innovation Counsel LLP

(57) ABSTRACT

A liquid crystal display according to an exemplary embodiment of the present invention includes a display panel and a light assembly configured to provide light to the display panel, wherein the light assembly includes: a light-emitting device configured to emit first light; a light guide positioned to receive the first light; and a quantum dot sheet positioned on the light guide and positioned to receive the first light from the light guide, the quantum dot sheet configured to emit second light responsive to the received first light. The quantum dot sheet includes a nanophosphor and an antioxidant, and the antioxidant includes at least one compound selected from a group including a phenol-based compound, a phosphorus-based compound, and a sulfur-based compound.

19 Claims, 12 Drawing Sheets

(56) References Cited

FOREIGN PATENT DOCUMENTS

KR     10-2014-0046840 A     4/2014
KR     10-2014-0113131 A     9/2014

* cited by examiner

LIQUID CRYSTAL DISPLAY HAVING QUANTUM DOT LIGHT GUIDE

CROSS-REFERENCE TO RELATED APPLICATION

This application claims priority to, and the benefit of, Korean Patent Application No. 10-2015-0179855 filed in the Korean Intellectual Property Office on Dec. 16, 2015, the entire contents of which are incorporated herein by reference.

BACKGROUND OF THE INVENTION (a) Field of the Invention

Embodiments of the present invention relate generally to displays. More specifically, embodiments of the present invention relate to liquid crystal displays having quantum dot light guides.

(b) Description of the Related Art

Generally, a liquid crystal display device is a device which generates an electric field by applying different potentials to a pixel electrode and a common electrode. A liquid crystal material is injected between an upper substrate on which the common electrode, a color filter, and the like are formed, and a lower substrate on which a thin film transistor, the pixel electrode, and the like are formed, so that the electric field resulting from these potentials alters an arrangement of liquid crystal molecules and control transmittance of light, thereby displaying images.

The liquid crystal display device is a non-self emissive device, and therefore a back surface of the display panel is provided with a light unit for supplying light to the display panel.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a liquid crystal display having improved efficiency and color reproducibility.

A liquid crystal display according to an exemplary embodiment of the present invention includes a display panel and a light assembly configured to provide light to the display panel, wherein the light assembly includes: a light-emitting device configured to emit first light; a light guide positioned to receive the first light; and a quantum dot sheet positioned on the light guide and positioned to receive the first light from the light guide, the quantum dot sheet configured to emit second light responsive to the received first light. The quantum dot sheet includes a nanophosphor and an antioxidant, and the antioxidant includes at least one compound selected from a group including a phenol-based compound, a phosphorus-based compound, and a sulfur-based compound.

The antioxidant may include two compounds selected from the group including the phenol-based compound, the phosphorus-based compound, and the sulfur-based compound.

The antioxidant may include the phenol-based compound, and may further include at least one of the phosphorus-based compound and the sulfur-based compound.

The nanophosphor may include at least one of a quantum dot and an inorganic phosphor.

The nanophosphor may include the quantum dot, and the quantum dot may include a first quantum dot configured to emit red light and a second quantum dot configured to emit green light.

The quantum dot sheet may further include at least one of a photopolymerization compound, a photopolymerization initiator, and a dispersant.

The quantum dot sheet may include a thermal hardening resin.

The light-emitting device may include a blue light emitting diode (LED).

The display panel may include a liquid crystal panel, and polarizers positioned on opposing surfaces of the liquid crystal panel.

The liquid crystal panel may include a first substrate, a transistor positioned on the first substrate, a pixel electrode connected to the transistor, a common electrode positioned to form an electric field along with the pixel electrode, a second substrate facing the first substrate to be separated therefrom, and a liquid crystal layer positioned between the first substrate and the second substrate.

The liquid crystal panel may include a substrate, a transistor positioned on the substrate, a pixel electrode connected to the transistor, a common electrode positioned to form an electric field along with the pixel electrode, a roof layer positioned to face the pixel electrode, and a liquid crystal layer positioned at a plurality of microcavities formed between the pixel electrode and the roof layer.

An optical sheet positioned between the light guide and the display panel may be further included.

A liquid crystal display according to an exemplary embodiment of the present invention includes a display panel and a light assembly configured to provide light to the display panel, wherein the light assembly includes a light-emitting device configured to emit first light; a light guide including an incident light surface; and a quantum dot tube positioned between the light-emitting device and the incident light surface, the quantum dot tube configured to receive the first light, to emit second light responsive to the received first light, and to direct the second light toward the incident light surface. The quantum dot tube includes a nanophosphor and an antioxidant, and the antioxidant includes at least one compound selected from a group including a phenol-based compound, a phosphorus-based compound, and a sulfur-based compound.

The antioxidant may include two compounds selected from the group including the phenol-based compound, the phosphorus-based compound, and the sulfur-based compound.

The antioxidant may include the phenol-based compound, and may further include at least one of the phosphorus-based compound and the sulfur-based compound.

The nanophosphor may include a least one of a quantum dot and an inorganic phosphor.

The nanophosphor may include the quantum dot, and the quantum dot may include a first quantum dot configured to emit red light and a second quantum dot configured to emit green light.

The quantum dot tube may further include at least one of the photopolymerization compound, the photopolymerization initiator, and the dispersant.

The quantum dot tube may include a thermal hardening resin.

The light-emitting device may include a blue light emitting diode (LED).

An optical sheet positioned between the light guide and the display panel may be further included.

The display panel may include a liquid crystal panel, and polarizers positioned on opposing surfaces of the liquid crystal panel.

The liquid crystal panel may include a first substrate, a transistor positioned on the first substrate, a pixel electrode connected to the transistor, a common electrode positioned to form an electric field along with the pixel electrode, a second substrate facing the first substrate to be separated therefrom, and a liquid crystal layer positioned between the first substrate and the second substrate.

The liquid crystal panel may include a substrate, a transistor positioned on the substrate, a pixel electrode connected to the transistor, a common electrode positioned to form an electric field along with the pixel electrode, a roof layer positioned to face the pixel electrode, and a liquid crystal layer positioned at a plurality of microcavities formed between the pixel electrode and the roof layer.

According to an exemplary embodiment of the present invention, a liquid crystal display having improved photo-efficiency and color reproducibility may be realized.

DETAILED DESCRIPTION OF THE EMBODIMENTS

Figure 1:
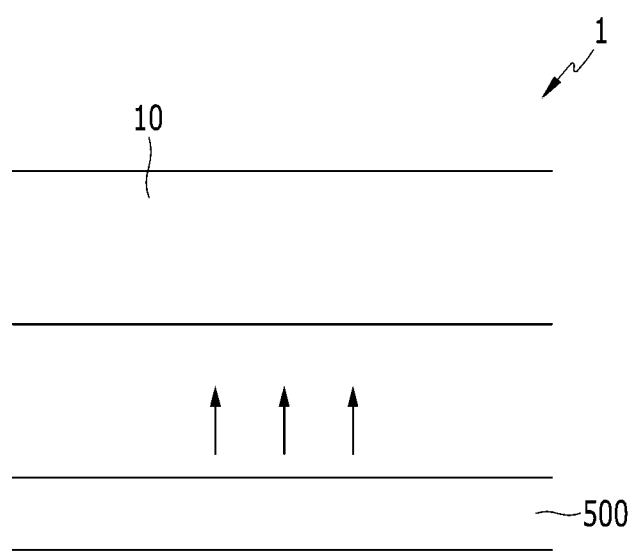
FIG. 1 is a schematic cross-sectional view of a liquid crystal display according to an exemplary embodiment of the present invention.

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thickness of layers, films, panels, regions, etc., are exaggerated for clarity. In the drawings, for ease of description, the thicknesses of some layers and regions are exaggerated. The various figures are thus not to scale.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

All numerical values are approximate, and may vary. All examples of specific materials and compositions are to be taken as nonlimiting and exemplary only. Other suitable materials and compositions may be used instead.

A liquid crystal display according to an exemplary embodiment of the present invention will be described with reference to FIG. 1 and FIG. 2A. FIG. 1 is a schematic cross-sectional view of a liquid crystal display according to an exemplary embodiment of the present invention, and FIG. 2A is a partial cross-sectional view of a liquid crystal display according to an exemplary embodiment of the present invention.

Referring to FIG. 1, a liquid crystal display according to an exemplary embodiment of the present invention will be described. The liquid crystal display 1 includes a light assembly 500 to supply light, and a display panel 10 receiving the light to display an image.

Figure 2A:
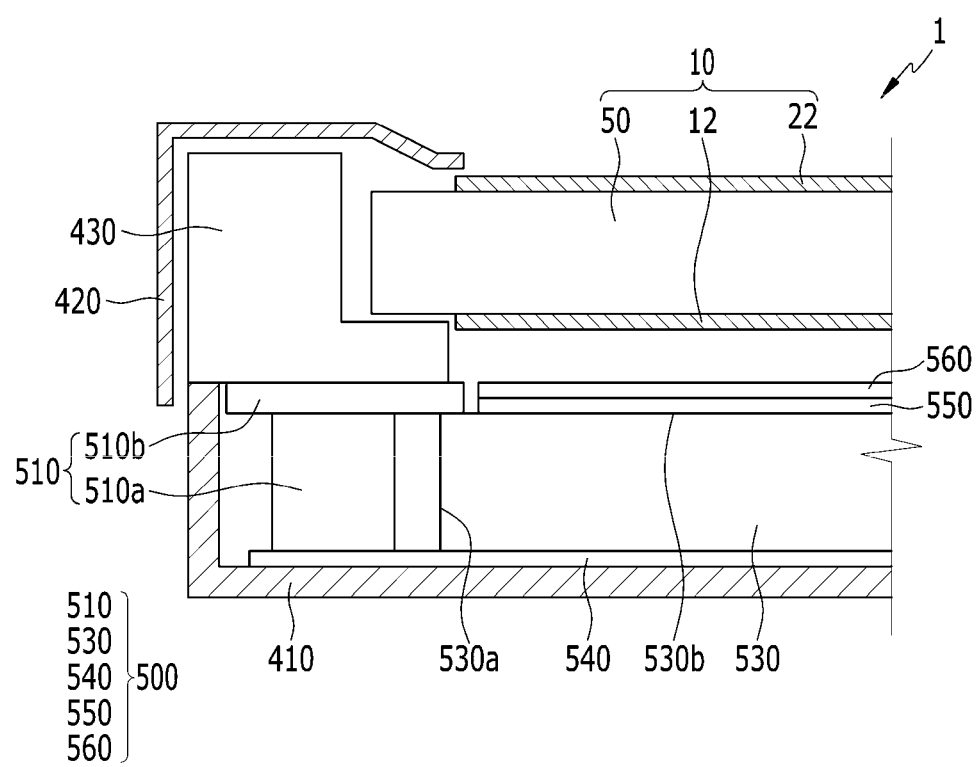
FIG. 2A is a partial cross-sectional view of a liquid crystal display according to an exemplary embodiment of the present invention.
Figure 2B:
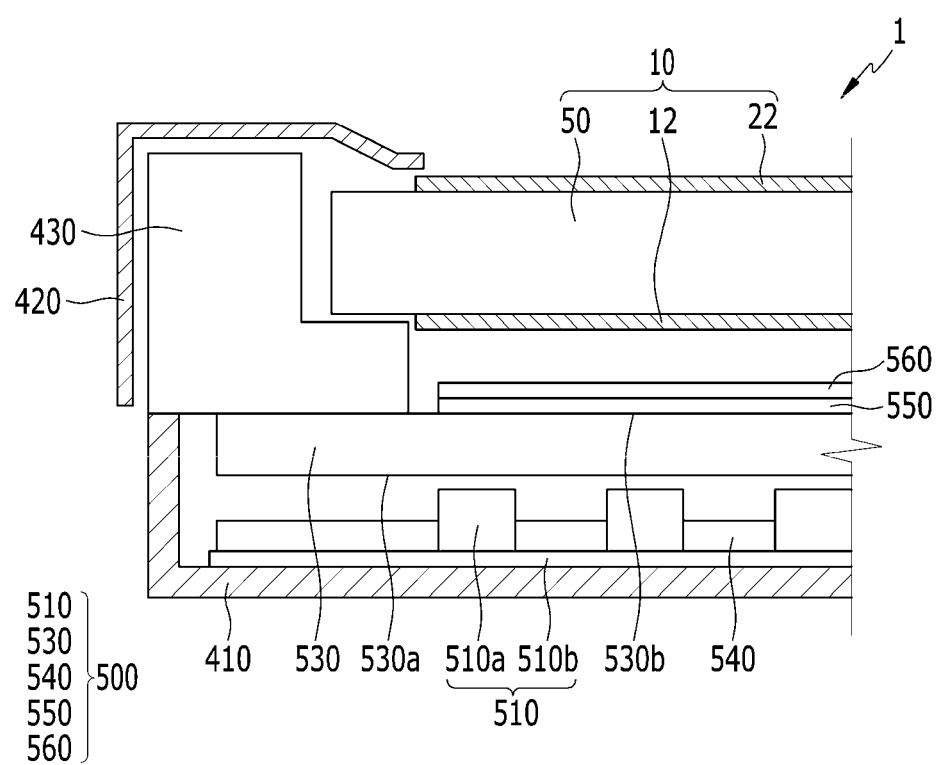
FIG. 2B is a cross-sectional view of a variation exemplary embodiment of FIG. 2A.

Next, referring to FIGS. 2A and 2B, the display panel 10 may include a liquid crystal panel 50 representing the image, and polarizers 12 and 22 positioned on respective surfaces of the liquid crystal panel 50. A first polarizer 12 and a second polarizer 22 for polarization of the light incident from the light assembly 500 are positioned on respective surfaces of the liquid crystal panel 50.

The polarizers 12 and 22 may use at least one among a triacetate cellulose (TAC) film, a polycarbonate (PC) film, a polyvinyl acetate (PVA) film, a wire grid polarizer, and an anisotropic mineral substrate such as a calcite. Also, these polarizers 12 and 22 are described as being formed as a film, however they may be positioned on one surface of the display panel through various methods such as coating and drying, or as an attachment. However, this description is an example, and embodiments of the invention are not limited thereto.

The liquid crystal panel 50 will be described with reference to FIG. 4 to FIG. 7, and the light assembly 500 and other constituent elements will be now be described.

In the liquid crystal display 1 according to an exemplary embodiment of the present invention, the light assembly 500 and the display panel 10 are fixed through a bottom chassis 410, a top chassis 420, and a mold frame 430.

In detail, the bottom chassis 410 is formed with a cuboid box shape of which an upper side is opened, and may have a receiving space of a predetermined depth therein. The bottom chassis 410 includes a chassis bottom surface and side walls extending upward from four edges of the chassis bottom surface. The light assembly 500 provides light to the display panel 10 and is provided in the receiving space.

Also, the top chassis 420 combines the display panel 10 and the light assembly 500 after mounting the display panel 10 connected to the mold frame 430.

The top chassis 420 has an upper surface enclosing the edge of the display panel 10, and a width of a bezel formed by the top chassis 420 may be very small or omitted according to an exemplary embodiment of the present invention.

The light assembly 500 according to an exemplary embodiment of the present invention includes a light-emitting device assembly 510, a light guide 530, a reflector 540, a quantum dot sheet 550 positioned at an emission surface of the light guide 530, and an optical sheet 560 positioned on the quantum dot sheet 550.

The light-emitting device assembly 510 is positioned facing one side surface of the light guide 530, to correspond to the incident light surface 530*a* of the light guide 530. The light-emitting device assembly 510 includes a plurality of light-emitting devices 510*a* and a printed circuit board (PCB) 510*b* in which the plurality of light-emitting devices 510*a* are mounted to be separated by one or more predetermined intervals.

As shown in FIG. 2A, the light-emitting device 510*a* is positioned to face an incident light surface 530*a* of the light guide 530, and is separated from the light guide 530 by a predetermined distance. To have the light emitted from the light-emitting device 510*a* incident to the incident light surface 530*a* of the light guide 530, the light-emitting device 510*a* is positioned so that a primary emission direction of the light is toward the incident light surface 530*a* of the light guide 530. That is, the light-emitting device 510*a* is positioned at the side of the light guide 530, thereby forming an edge type light guide.

The light-emitting device 510*a*, for example, may be a blue light emitting diode (LED). The blue light emitting diode (LED) may emit first light having a wavelength of about 430 nm to about 450 nm.

In the present specification, the light-emitting device 510*a* faces one incident light surface 530*a*. However, it is not limited thereto, and the light guide 530 may have two incident light surfaces positioned at respective side surfaces, and the light-emitting device 510*a* may be formed to face the two incident light surfaces. In this case, the light emitted from the light-emitting device 510*a* is incident to both side surfaces of the light guide 530. Also, the light guide 530 may have four incident light surfaces, and the light-emitting device 510*a* may be disposed at all regions facing the four incident light surfaces.

A plurality of light-emitting devices 510*a* may be provided, and the plurality of light-emitting devices 510*a* may be disposed at a predetermined interval. However, the present invention is not limited thereto, and the plurality of light-emitting devices 510*a* may be irregularly disposed, or disposed at more than one predetermined interval.

For the printed circuit board (PCB) 510*b*, the light-emitting device 510*a* is mounted on one surface of the printed circuit board (PCB) 510*b* to extend toward the bottom chassis 410. The printed circuit board (PCB) is configured as an electronic circuit by providing a substrate coated with a thin copper film on an insulating plate, and removing unnecessary copper film along a circuit diagram.

The light-emitting device 510*a* mounted on the printed circuit board (PCB) 510*b* may be connected by wiring (not shown). The plurality of light-emitting devices 510*a* may all be connected together by the wiring, or may be connected to be divided into a plurality of groups.

The light guide 530 includes the incident light surface 530*a* where the light emitted from the light-emitting device 510*a* is incident, and an emission light surface 530*b* substantially uniformly emitting the light incident through the incident light surface 530*a*. The light guide 530 substantially uniformly transmits the light emitted from the light-emitting device 510*a* to the display panel 10. When the display panel 10 is positioned on the light assembly 500 and forms the display device, the light guide 530 substantially uniformly emits the light incident to the incident light surface 530*a* to the emission light surface 530*b*, thereby substantially uniformly transmitting the light to the display panel 10.

The light guide 530 may be made of, for example, a plastic material such as a poly(methyl methacrylate) (PMMA) as an acryl-based transparent resin, or a polycarbonate (PC)-based material, as a light transmissive material.

The light guide 530 may use a wedge-type plate or a flat-type plate. Also, the light guide 530 may include a pattern of a predetermined shape or shapes on the rear surface to supply more uniform light, and the pattern may be variously configured such as with an elliptical pattern, a polygon pattern, or a hologram pattern to guide the light incident inside the light guide 530. In this case, the direction of the light emitted from the lateral light-emitting device 510*a* is changed to that of the front surface through the pattern of the rear surface of the light guide 530, and as the pattern is increased in the light guide 530 or the density thereof is increased, a contact opportunity with the emission light is increased such that the light efficiency may also be increased.

The light assembly 500 according to an exemplary embodiment of the present invention may further include the reflector 540 positioned at the rear surface of the light guide 530.

The reflector 540 changes a light path of the light emitted from the light-emitting device 510*a* in the direction toward the display panel 10, so as to prevent light leakage. That is, when the light emitted from the light-emitting device 510*a* is emitted toward the bottom surface of the light guide 530, the reflector 540 again reflects the light to be incident inside the light guide 530.

The quantum dot sheet 550 according to an exemplary embodiment of the present invention is positioned on the emission light surface 530*b* of the light guide 530. The quantum dot sheet 550 converts the light emitted from the light guide 530 and emits this converted light, thereby providing further improved color reproducibility.

In detail, the quantum dot sheet 550 may include a nanophosphor. The nanophosphor may include at least one of a quantum dot and an inorganic phosphor.

As one example, the quantum dot sheet 550 may include the quantum dot, and the quantum dot may include a first quantum dot converting blue light into red light and a second quantum dot converting blue light into green light. The quantum dot sheet 550 is in a state such that the first quantum dot and the second quantum dot are mixed and hardened, so that the blue light emitted from the light-emitting device 510*a* is converted into white light having a desirable light characteristic, that is, second light, in a process of passing through the quantum dot sheet 550 in which the first quantum dot and the second quantum dot are mixed.

Next, the quantum dot sheet 550 according to an exemplary embodiment of the present invention will be described in further detail.

The quantum dot may include a Group II-VI compound, a Group III-V compound, a Group IV-VI compound, a Group IV element, a Group IV compound, or combinations thereof.

The Group II-VI compound may be selected from the group consisting of a binary compound selected from the group consisting of CdSe, CdTe, ZnS, ZnSe, ZnTe, ZnO, HgS, HgSe, HgTe, MgSe, MgS, and a mixture thereof; a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may be selected from the group consisting of a binary compound selected from the group consisting of GaN, GaP, GaAs, GaSb, AN, AlP, AlAs, AlSb, InN, InP, InAs, InSb, and a mixture thereof; a ternary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may be selected from the group consisting of a binary compound selected from the group consisting of SnS, SnSe, SnTe, PbS, PbSe, PbTe, and a mixture thereof; a ternary compound selected from the group consisting of SnSeS, SnSeTe, SnSTe, PbSeS, PbSeTe, PbSTe, SnPbS, SnPbSe, SnPbTe, and a mixture thereof; and a quaternary compound selected from the group consisting of SnPbSSe, SnPbSeTe, SnPbSTe, and a mixture thereof. The Group IV element may be selected from the group consisting of Si, Ge, and a mixture thereof. The Group IV compound may be a binary compound selected from the group consisting of SiC, SiGe, and a mixture thereof.

In this case, the binary compound, the ternary compound, or the quaternary compound may exist in particles at a substantially uniform concentration, or may exist in the same particle divided into states where concentration distributions are partially different, i.e. the particle may be heterogeneous in its composition. Further, the color conversion media layer may have a core/shell structure where one quantum dot surrounds another quantum dot. An interface between the core and the shell may have a concentration gradient, such that a concentration of an element existing in the shell is gradually reduced nearer to the center thereof.

For example, the quantum dot may have a core/shell structure including a core and a shell covering the core.

The core may include one or more materials selected from the group consisting of CdSe, CdS, ZnS, ZnSe, CdTe, CdSeTe, CdZnS, PbSe, AgInZnS, ZnTe, CdSeS, PbS, PbTe, HgS, HgSe, HgTe, GaN, GaP, GaAs, InP, InZnP, InGaP, InGaN, InAs, and ZnO, but is not limited thereto. The shell may include one or more materials selected from the group consisting of CdSe, ZnSe, ZnS, ZnTe, CdTe, PbS, TiO, SrSe, CdO, CdS, ZnO, InP, InS, GaP, GaN, GaO, InZnP, InGaP, InGaN, InZnSCdSe, and HgSe, but is not limited thereto.

The quantum dot may further include a capping layer enclosing the shell and combined with the shell. The capping layer may be at least one among an organic ligand, an organic coating layer, and an inorganic coating layer.

The organic ligand and the organic coating layer may include an amine group, a carboxyl group, a thiol group, an alcohol group, a pyridine group, a thiol group, a phosphine group, a phosphine oxide, or the like, however it is not limited thereto.

The inorganic coating layer may include $TiO_2$, $SiO_2$, $MgF_2$, $ZrO_2$, or the like, however it is not limited thereto.

The quantum dot may be stabilized by the organic ligand, the organic coating layer, and the inorganic coating layer included in the capping layer. Accordingly, internal quantum efficiency may be maintained in a high temperature environment, and a heat resistance characteristic may be improved. Also, since it is possible for the quantum dot to be partially enclosed by the capping layer, the light inflow and the light emission efficiency to the quantum dot may be improved.

An average particle diameter of the core of the core/shell quantum dot may be 2 nm to 5 nm. An average thickness of the shell may be 3 nm to 5 nm. Further, the average particle diameter of the quantum dot may be 5 nm to 10 nm. In the case where the core, the shell, and the quantum dot satisfy the aforementioned ranges of average particle diameter or average thickness, behavior characteristic of a quantum dot may be exhibited, and in a composition for forming a pattern, excellent dispersibility may be achieved. In the aforementioned ranges, by variously selecting the particle diameter of the core, the average thickness of the shell, and the average particle diameter of the quantum dot, light emitting colors of the quantum dot and/or semiconductor characteristics of the quantum dot and the like may be variously altered as desired.

Further, the precise form of the quantum dot may be for instance any one generally used in the art and is not particularly limited, but more specifically, it is preferable to use forms such as spherical, pyramidal, multi-armed, or cubic nanoparticles, nanotubes, nanowires, nanofibers, and nanoplate-shaped particles.

The nanophosphor according to an exemplary embodiment of the present invention may be an inorganic phosphor, and the inorganic phosphor may include one or more of garnets, silicates, sulfides, oxides (oxynitrides), nitrides, and aluminates.

The inorganic phosphor may include one or more materials selected from a group including $Y_3Al_5O_{12}:Ce^{3+}$ (YAG:Ce), $Tb_3Al_5O_{12}:Ce^{3+}$ (TAG:Ce), $(Sr,Ba,Ca)_2SiO_4:Eu^{2+}$, $(Sr,Ba,Ca,Mg,Zn)_2Si$, $(OD)_4:Eu^{2+}$ (D=F,Cl,S,N,Br), $Ba_2MgSi_2O_7:Eu^{2+}$, $Ba_2SiO_4:Eu^{2+}$, $Ca_3(Sc,Mg)_2Si3O_{12}:Ce^{3+}$, $(Ca,Sr)S:Eu^{2+}$, $(Sr,Ca)Ga_2S_4:Eu^{2+}$, $SrSi_2O_2N_2:Eu^{2+}$, $SiAlON:Ce^{3+}$, $\beta\text{-}SiAlON:Eu^{2+}$, $Ca\text{-}\alpha\text{-}SiAlON:Eu^{2+}$, $Ba_3Si_6O_{12}N_2:Eu^{2+}$, $CaAlSiN_3:Eu^{2+}$, $(Sr,Ca)AlSiN_3:Eu^{2+}$, $Sr_2Si_5N_8:Eu^{2+}$, $(Sr,Ba)Al_2O_4:Eu^{2+}$, $(Mg,Sr)Al_2O_4:Eu^{2+}$, and $BaMg_2Al_{16}O_{27}:Eu^{2+}$.

The quantum dot sheet 550 according to an exemplary embodiment of the present invention further includes an antioxidant. The antioxidant includes at least one compound among a phenol-based compound, a phosphorus-based compound, and a sulfur-based compound. As one example, the quantum dot sheet 550 according to an exemplary embodiment of the present invention may include two compounds among the phenol-based compound, the phosphorus-based compound, and the sulfur-based compound. If two compounds are included, the antioxidant can include the phenol-based compound and the phosphorus-based compound, the phosphorus-based compound and the sulfur-based compound, or the phenol-based compound and the sulfur-based compound.

Also, according to an exemplary embodiment of the present invention, the antioxidant includes the phenol-based compound, and in addition may include at least one of the phosphorus-based compound and the sulfur-based compound. The antioxidant according to this exemplary embodiment may include the phenol-based compound and the phosphorus-based compound, may include the phenol-based compound and the sulfur-based compound, or may include the phenol-based compound, the phosphorus-based compound, and the sulfur-based compound.

The phenol-based antioxidant may include one kind or more selected from 2,6-di-tert-butyl-p-cresol, 2,6-diphenyl-4-octadesiloxyphenol, stearyl(3,5-di-tert-butyl-4-hydroxyphenyl) propionate, distearyl(3,5-di-tert-butyl-4-hydroxybenzyl)phosphonate, tridecyl 3,5-di-tert-butyl-4-hydroxybenzyl thioacetate, thiodiethylenebis[(3,5-di-tert-butyl-4-hydroxyphenyl) propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl) butyric acid]glycolester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl) isocyanurate, 1,3,5-tris (3,5-di-tert-butyl-4-hydroxybenzyl) isocyanurate, 1,3,5-tris (3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis [methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethyleneglycolbis[β-(3-tert-butyl-4-hydroxy-5-methylphenyl) propionate], and tocophenol.

The phosphorus-based antioxidant may include one kind or more selected from triphenyl phosphite, tris(2,4-di-tert-butylphenyl)phosphite, tris(2,5-di-tert-butylphenyl)phosphite, tris(nonylphenyl)phosphite, tris(dinonylphenyl)phosphite, tris(mono,di-mixed nonylphenyl)phosphite, diphenylacid phosphite, 2,2'-methylenebis(4,6-di-tert-butylphenyl)octyl phosphite, diphenyldecyl phosphite, diphenyl-loctyl phosphite, di(nonylphenyl)pentaerythritol diphosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentylglycol).1,4-cyclohexanedimethyl diphosphite, bis(2,4-di-tert-butylphenyl) pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearylpentaerythritol diphosphite, tetra(C12-15 mixed-alkyl)-4,4'-isopropylidenediphenyl phosphite, bis[2,2'-methylenebis(4,6-diamylphenyl)].isopropylidenediphenyl phosphite, tetratridecyl.4,4'-butylidenebis(2-tert-butyl-5-methylphenol)diphosphite, hexa(tridecyl).1,1,3-tris(2-methyl-5-tert-butyl-4-hydroxyphenyl)butane triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepin-6-yl)oxy]ethyl)amine, 9,10-dihydro-9-oxa-10-phosphaphenanthrene-10-oxide, tris(2-[(2,4,8,10-tetrakis-tert-butyldibenzo[d,f][1,3,2]dioxaphosphepin-6-yl)oxy] ethyl)amine, and 2-(1,1-dimethylethyl)-6-methyl-4-[3-[[2,4, 8,10-tetrakis(1,1-dimethylethyl)dibenzo[d,f][1,3,2] dioxaphosphepin-6-yl]oxy]propyl]phenol2-butyl-2-ethylpropanediol 2,4,6-tri-tert-butylphenol monophosphite.

The sulfur-based antioxidant may use dialkylthiodipropionates, or β-alkylmercaptopropionic acid esters of polyol, but it is not limited thereto. Here, the dialkylthiodipropionate may be at least one among a dilauryl thiodipropionic acid, a dimyristyl thiodipropionic acid, a myristylstearyl thiodipropionic acid, and a distearylester thiodipropionic acid. Also, the β-alkylmercaptopropionic acid esters of polyol may be a pentaerythritoltetra(β-dodecyl mercaptopropionate), but are not limited thereto.

The antioxidant may be included in an amount of 1 to 20 wt % based on a total weight of a solid of the resin composition. To manufacture the quantum dot sheet, this amount is preferably 1 to 5 wt %, however embodiments are not limited thereto.

The quantum dot sheet 550 according to the exemplary embodiment of the present invention may include the aforementioned antioxidant to have desirable heat resistance and chemical resistance characteristics. Accordingly, the nanophosphor included in the quantum dot sheet 550 may be prevented from being damaged or quenched due to UV radiation or heat generated during the process.

Particularly, the phenol-based antioxidant has the desirable effect of preventing oxidation phenomena generated in exposure or coating (or depositing) of the resin composition, when the resin composition is hardened and then is mounted on the display device as the quantum dot sheet 550, wherein oxidation phenomena due to gas or active oxygen may be suppressed through the sulfur-based compound or the phosphorus-based antioxidant.

Generally, the resin composition generates free radicals in post-process steps that involve conditions such as high temperature, which reduces heat resistance and chemical resistance of the nanophosphor. As a result, a reduction of light quantity due to damage of the nanophosphor may occur. However, the resin composition according to the exemplary embodiment of the present invention may include an antioxidant to deactivate the free radicals and thus have desirable heat resistance and chemical resistance.

Specifically, the free radicals generated at high temperatures have good reactivity and thus are reacted with ambient oxygen (refer to Reaction Equation 1), and the free radicals reacted with oxygen are bonded at a rapid speed with a hydroxy group of di-t-butylphenol that is a substituent group included in the antioxidant to be deactivated (refer to Reaction Equation 2).

R+O$_2$→ROO.     [Reaction Equation 1]

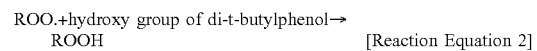

ROO.+hydroxy group of di-t-butylphenol→ ROOH     [Reaction Equation 2]

The quantum dot sheet 550 according to an exemplary embodiment of the present invention is formed by coating or spinning the resin composition, or may be a sheet that is ejected as a film type. In this case, the resin composition may be a thermal hardening resin composition or a photosensitive resin composition including the above-described nanophosphor and antioxidant.

When the quantum dot sheet 550 is formed of the thermal hardening resin composition, the thermal hardening resin may use an epoxy resin, a phenol resin, a melamine resin, a urea resin, an unsaturated polyester resin, a silicone, a polyurethane, an allyl resin and a thermosetting acryl resin, a phenol-melamine polycondensation resin, a urea melamine polycondensation resin, and the like, however embodiments are not limited thereto.

When the quantum dot sheet 550 is formed of the photosensitive resin composition, the photosensitive resin composition may further include a photopolymerization initiator, a photopolymerization compound, and a solvent.

The photopolymerization initiator is a material serving to initiate cross-linking and curing reactions between photosensitive functional groups and photosensitive materials in the photosensitive resin composition, and one kind or more selected from acetophenone-based, benzoin-based, benzophenone-based, triazine-based, oxime-based, and thioxanthone-based photopolymerization initiators may be used.

Examples of the acetophenone-based photopolymerization initiator may include 4-phenoxy dichloroacetophenone, 4-t-butyl dichloroacetophenone, 4-t-butyl trichloroacetophenone, 2,2-diethoxyacetophenone, 2-hydroxy-2-methyl-1-phenylpropane-1-one, 1-(4-isopropylphenyl)-2-hydroxy-2-methyl-propane-1-one, 1-(4-dodecylphenyl)-2-hydroxy-2-methylpropane-1-one, 4-(2-hydroxyethoxy)-phenyl-(2-hydroxy-2-propyl)ketone, 1-hydroxycyclohexylphenylketone, 2-methyl-1-[4-(methylthio)phenyl]-2-morpholino-propane-1-one, and the like, but are not limited thereto.

As the benzoin-based photopolymerization initiator, benzoin, benzoin methyl ether, benzoin ethyl ether, benzoin isopropyl ether, benzoin isobutyl ether, benzyl dimethyl ketal, and the like may be used, but the benzoin-based photopolymerization initiator is not limited thereto.

Examples of the benzophenone-based photopolymerization initiator may include benzophenone, benzoyl benzoic acid, benzoyl benzoic acid methyl ester, 4-phenylbenzophenone, hydroxybenzophenone, 4-benzoyl-4'-methyldiphenyl sulphide, 3,3'-dimethyl-4-methoxybenzophenone, and the like, but embodiments are not limited thereto.

Examples of the triazine-based photopolymerization initiator may include 2,4,6-trichloro-s-triazine, 2-phenyl 4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl 4,6-bis(trichloromethyl)-s-triazine, bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like.

As the oxime-based photopolymerization initiator, an O-acyloxime-based compound, 2-(o-benzoyloxime)-1-[4-(phenylthio)phenyl]-1,2-octanedione, 1-(o-acetyloxime)-1-[9-ethyl-6-(2-methylbenzoyl)-9H-carbazole-3-yl]ethanone, 0-ethoxycarbonyl-α oxyamino-1-phenylpropane-1-one, and the like may be used. Specific examples of the O-acyloxime-based compound may include 1,2-octanedione, 2-dimethylamino-2-(4-methylbenzyl)-1-(4-morpholine-4-yl-phenyl)-butane-1-one, 1-(4-phenylsulfanylphenyl)-butane-1,2-dione 2-oxime-O-benzoate, 1-(4-phenylsulfanylphenyl)-octane-1,2-dione 2-oxime-O-benzoate, 1-(4-phenylsulfanylphenyl)-octane-1-one oxime-O-acetate, 1-(4-phenylsulfanylphenyl)-butane-1-one oxime-O-acetate, and the like.

Examples of the thioxanthone-based photopolymerization initiator may include thioxanthone, 2-chlorothioxanthone, 2-methylthioxanthone, isopropylthioxanthone, 2,4-diethylthioxanthone, 2,4-diisopropylthioxanthone, and the like.

A content of the photopolymerization initiator is not limited to any of the above, and may be selected in any manner, in consideration of initiation performance of the photopolymerization initiator, a size of a photosensitive resin pattern to be formed, and the like.

The photopolymerization compound may participate in cross-linking and curing reactions together with a photosensitive compound or a photosensitive functional group bonded to a surface of the nanophosphor during exposure, to serve to increase resolution of the photosensitive resin pattern and durability of a cured material.

As the photopolymerization compound, monofunctional or multi-functional esters of (meth)acrylic acid having at least one ethylenically unsaturated double bond may be used alone, or two kinds or more thereof may be used together.

The photopolymerization compound may have an ethylenically unsaturated double bond, to cause sufficient polymerization during exposure in a process of forming a pattern. The compound may thus form a pattern having excellent heat resistance, light resistance, and chemical resistance.

Specific examples of the photopolymerization compound may include ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy(meth)acrylate, ethylene glycol monomethylether(meth)acrylate, trimethylol propane tri(meth)acrylate, tris(meth)acryloyloxyethyl phosphate, novolac epoxy(meth)acrylate, and the like.

The photopolymerization compound may be treated by an acid anhydride, to achieve a superior developing property.

Further, the photopolymerization compound may be a multi-functional acrylate-based compound or a multi-functional polyalkylene oxide or polysiloxane-based polymer including one or more of an acryl group and a vinyl group.

Examples of the photopolymerization compound may include urethane acrylate, allyloxylated cyclohexyl diacrylate, bis(acryloxyethyl)hydroxyl isocyanurate, bis(acryloxyneopentylglycol) adipate, bisphenol A diacrylate, bisphenyl A dimethacrylate, 1,4-butanediol diacrylate, 1,4-butanediol dimethacrylate, 1,3-butyleneglycol diacrylate, 1,3-butyleneglycol dimethacrylate, dicyclopentanyl diacrylate, diethyleneglycol diacrylate, diethyleneglycol dimethacrylate, dipentaerythrol hexaacrylate, dipentaerythrol monohydroxy hexaacrylate, ditrimethylolprpane tetraacrylate, ethyleneglycol dimethacrylate, glyceol methacrylate, 1,6-hexanediol diacrylate, neopentylglycol dimethacrylate, neopentylglycol hydroxypivalate diacrylate, pentaerythritol triacrylate, pentaerythritol tetraacrylate, phosphoric acid dimethacrylate, polyethyleneglycol diacrylate, polypropyleneglycol diacrylate, tetraethyleneglycol diacrylate, tetrabromobisphenol A diacrylate, triethyleneglycol divinylether, triglycerol diacrylate, trimethylolpropane triacrylate, tripropyleneglycol diacrylate, tris(acryloxyethyl) isocyanurate, phosphoric acid triacrylate, phosphoric acid diacrylate, acrylic acid propargyl ester, polydimethylsiloxane having a vinyl group at a terminal thereof (vinyl-terminated polydimethylsiloxane), a diphenylsiloxane-dimethylsiloxane copolymer having a vinyl group at a terminal thereof (vinyl-terminated diphenylsiloxane-dimethylsiloxane copolymer), polyphenylmethylsiloxane having a vinyl group at a terminal thereof (vinyl-terminated polyphenylmethylsiloxane), a trifluoromethylsiloxane-dimethylsiloxane copolymer having a vinyl group at a terminal thereof (vinyl-terminated trifluoromethylsiloxane-dimethylsiloxane copolymer), a diethylsiloxane-dimethylsiloxane copolymer having a vinyl group at a terminal thereof (vinyl-terminated diethylsiloxane-dimethylsiloxane copolymer), vinylmethylsiloxane, polydimethyl siloxane having a monomethacryloxypropyl group at a terminal thereof (monomethacryloyloxypropyl-terminated polydimethyl siloxane), polydimethyl siloxane having a monovinyl group at a terminal thereof (monovinyl-terminated polydimethyl siloxane), or polyethylene oxide having a monoallyl group or a monotrimethylsiloxy group at a terminal thereof (monoallyl-monotrimethylsiloxy-terminated polyethylene oxide).

The content of the photopolymerization compound is not limited to any of the above, and may be appropriately selected in consideration of photocuring properties (a curing speed, a cured film state, and the like), the bond number of photosensitive functional groups of the surface of the nanophosphor, and the like.

The photopolymerization compound may further include one or more materials selected from a cyanine-based material, a merocyanine-based material, an oxonol-based material, a phthalocyanine-based material, an azo-based material, a fluorene-based material, a thiophene-based material, a diphenylethene-based material, and a phenoxazine-based material in order to form a precise pattern, but is not limited thereto.

Further, as the solvent that may be included in the photosensitive resin composition, ethyleneglycol acetate, ethylcellosolve, propyleneglycolmethylether acetate, ethyl lactate, polyethyleneglycol, cyclohexanone, propyleneglycolmethylether, and the like may be used Also, the photosensitive resin composition may further include a dispersant. A non-ionic dispersant, an ionic dispersant, or a cationic dispersant may be selectively used. For example, polyalkylene glycol and esters thereof; polyoxyalkylene; a polyalcohol ester alkylene oxide addition; an alcohol alkylene oxide addition, and the like may be used alone or used while being appropriately combined.

The dispersant is an added material that disperses the nanophosphor in the solvent to make a stable suspension.

The photosensitive resin composition according to an exemplary embodiment of the present invention may further include a scatterer. The scatterer scatters the incident light to increase the intensity of light emitted and to make the front luminance and the lateral luminance be more uniform.

As one example, the scatterer may include at least one among TiO2, Al2O3, and SiO2, and but is not limited thereto.

The content and the size of the scatterer are not specially limited, and may be appropriately selected by considering the configuration of the photosensitive resin composition. In this case, the diameter (nm) of the scatterer may be 1/10 to 5/10 of the wavelength (nm) of light emitted from the photosensitive resin composition, thus improving the scattering efficiency of the emitted light.

Next, the optical sheet 560 may be positioned on the quantum dot sheet 550, or alternatively may be omitted according to an exemplary embodiment. The optical sheet 560 positioned on the light guide 530 diffuses the light emitted from the light guide 530, thereby serving to make a more uniform luminance distribution.

The optical sheet is not limited to this function, and any sheet may be included. The optical sheet may include one layer or a plurality of layers, or may be omitted, and a protecting sheet having other characteristics may be further included.

The above-described display device 1 includes the light assembly 500 realizing white light having desirable light characteristics. Accordingly, when using the blue light-emitting device 510a having low color reproducibility as the light source, color reproducibility is improved.

Next, a variation exemplary embodiment will be described with reference to FIG. 2B, and the description of elements that are the same as or similar to the exemplary embodiment of FIG. 2A is omitted.

Referring to FIG. 2B, the light assembly 500 according to the variation exemplary embodiment of the present invention includes the light-emitting device assembly 510, the light guide 530, the reflector 540, the quantum dot sheet 550 positioned on the emission light surface of the light guide 530, and the optical sheet 560 positioned on the quantum dot sheet 550.

The light-emitting device assembly 510 is positioned facing one surface of the light guide 530 to correspond to the incident light surface 530a of the light guide 530. The light-emitting device assembly 510 includes the plurality of light-emitting devices 510a and the printed circuit board (PCB) 510b in which the plurality of light-emitting devices 510a are mounted to be separated by one or more predetermined intervals.

As shown in FIG. 2B, the light-emitting device 510a is positioned to face the incident light surface 530a of the light guide 530, and is separated from the light guide 530 by a predetermined distance. To make the light emitted from the light-emitting device 510a primarily fall incident to the incident light surface 530a of the light guide 530, the light-emitting device 510a is positioned so that the primary emission direction is oriented toward the incident light surface 530a of the light guide 530. That is, the light-emitting device 510a is positioned at the rear of (i.e. below) the light guide 530.

The printed circuit board (PCB) 510b is mounted with the lower surface of the printed circuit board (PCB) 510b, i.e. the surface opposite the light emitting devices 510a, facing the bottom chassis 410. The printed circuit board (PCB) is configured as an electronic circuit, with an insulating substrate coated with a thin copper film, as previously described.

The light guide 530 includes the incident light surface 530a where the light emitted from the light-emitting device 510a falls incident, and the emission light surface 530b substantially uniformly emitting the light incident through the incident light surface 530a. The incident light surface 530a and the emission light surface 530b of the light guide according to FIG. 2B may be substantially parallel to each other.

The light assembly 500 according to an exemplary embodiment of the present invention may further include the reflector 540 facing the incident light surface 530a of the light guide 530. The reflector 540 may be positioned on the printed circuit board (PCB) 510b.

The reflector 540 changes a light path of the light emitted from the light-emitting device 510a in the direction toward the display panel 10, i.e. reflects light back up toward the light guide 530, so as to prevent light leakage. That is, when the light emitted from the light-emitting device 510a is not toward the incident light surface 530a of the light guide 530 and is emitted in another direction, the reflector 540 reflects the light toward the incident light surface 530a of the light guide 530.

The quantum dot sheet 550 according to an exemplary embodiment of the present invention is positioned on the emission light surface 530b of the light guide 530. The quantum dot sheet 550 converts the light within the light guide 530 to be emitted as color-converted light that provides improved color reproducibility. The quantum dot sheet 550 is substantially the same as the quantum dot sheet 550 described in the exemplary embodiment according to FIG. 2A.

Figure 3:
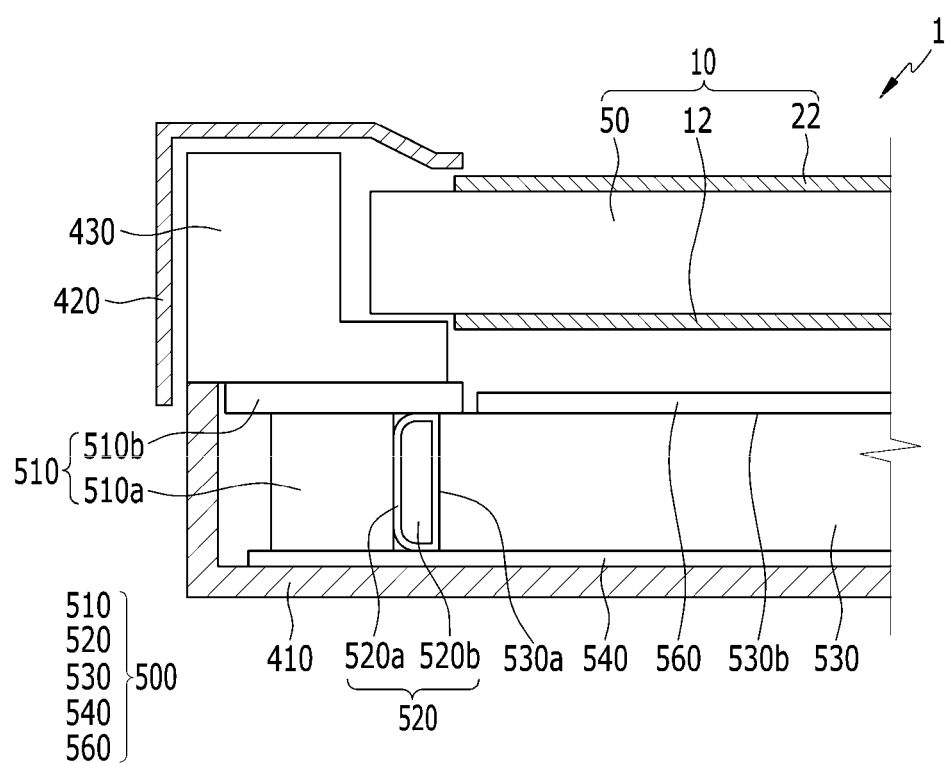
FIG. 3 is a partial cross-sectional view of a liquid crystal display according to an exemplary embodiment of the present invention.

Next, a liquid crystal display according to an exemplary embodiment of the present invention will be described with reference to FIG. 3. FIG. 3 is a partial cross-sectional view of a liquid crystal display according to an exemplary embodiment of the present invention. The description of those constituent elements that are the same as or similar to the constituent elements described in FIG. 2 is omitted.

The light assembly 500 shown in FIG. 3 includes the light-emitting device assembly 510, a quantum dot tube 520, the light guide 530, the reflector 540 positioned at the rear of the light guide 530, and the optical sheet 560 positioned on the light guide 530.

The light-emitting device assembly 510 is positioned facing one side of the light guide 530 to correspond to the incident light surface 530a of the light guide 530. The light-emitting device assembly 510 includes a plurality of light-emitting devices 510a, and a printed circuit board (PCB) 510b on which the plurality of light-emitting devices 510a are mounted to be separated by at least one predetermined interval.

As shown in FIG. 3, each light-emitting device 510a is positioned to face the incident light surface 530a of the light guide 530 and is separated from the light guide 530 by a predetermined distance. The light-emitting device 510a are positioned so that their primary emission direction is toward the incident light surface 530a of the light guide 530. That is, the light guide 530 is an edge type light guide.

The light-emitting device 510a, for example, may be a blue light emitting diode (LED). The blue light emitting diode (LED) may emit blue light, that is, light having a wavelength of about 430 nm to about 450 nm.

The printed circuit board (PCB) 510b is mounted with the light-emitting devices 510a on one surface of the printed circuit board (PCB) 510b of the bottom chassis 410. The printed circuit board (PCB) is configured as an electronic circuit by providing a substrate coated with a thin copper film, as above.

The quantum dot tube 520 according to an exemplary embodiment of the present invention is positioned between the light-emitting devices 510a and the incident light surface 530a of the light guide 530. The quantum dot tube 520 converts light emitted from the light-emitting device 510a into white light to be emitted from the light guide 530, thereby providing improved color reproducibility.

The quantum dot tube 520 may have a long column shape in the length direction while filling a space between the light-emitting device 510a and the incident light surface 530a of the light guide 530. The column shaped quantum dot tube 520 may correspond to, e.g. extend, the length of the light-emitting device assembly 510.

The quantum dot tube 520 includes a glass tube 520a and a resin composition 520b sealed in the glass tube 520a. The glass tube 520a seals the resin composition 520b and prevents external moisture penetration. The glass tube 520a may be rectangular or oval in cross-section.

In detail, the resin composition 520b is injected inside the glass tube 520a after it is evacuated. The resin composition 520b may include a nanophosphor and may be positioned in the glass tube 520a in a hardened state.

The resin composition 520b included in the quantum dot tube 520 includes a nanophosphor including at least one of the quantum dot and the inorganic phosphor. As one example, when the quantum dot tube 520 includes a quantum dot, the quantum dot may include a first quantum dot converting blue light into red light, and a second quantum dot converting blue light into green light. The quantum dot tube 520 is in a state such that the first quantum dot and the second quantum dot are mixed and hardened, so that blue light emitted from the light-emitting device 510a is converted into white light having desirable light characteristics in the process of passing through the quantum dot tube 520.

Next, the resin composition 520b according to an exemplary embodiment of the present invention will be described in further detail.

The resin composition 520b according to an exemplary embodiment of the present invention includes a nanophosphor, and the nanophosphor may include at least one of a quantum dot and an inorganic phosphor.

The quantum dot may include a Group II-VI compound, a Group III-V compound, a Group IV-VI compound, a Group IV element, a Group IV compound, or combinations thereof.

The Group II-VI compound may be selected from the group consisting of a binary compound selected from the group consisting of CdSe, CdTe, ZnS, ZnSe, ZnTe, ZnO, HgS, HgSe, HgTe, MgSe, MgS, and a mixture thereof; a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may be selected from the group consisting of a binary compound selected from the group consisting of GaN, GaP, GaAs, GaSb, AN, AlP, AlAs, AlSb, InN, InP, InAs, InSb, and a mixture thereof; a ternary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may be selected from the group consisting of a binary compound selected from the group consisting of SnS, SnSe, SnTe, PbS, PbSe, PbTe, and a mixture thereof; a ternary compound selected from the group consisting of SnSeS, SnSeTe, SnSTe, PbSeS, PbSeTe, PbSTe, SnPbS, SnPbSe, SnPbTe, and a mixture thereof; and a quaternary compound selected from the group consisting of SnPbSSe, SnPbSeTe, SnPbSTe, and a mixture thereof. The Group IV element may be selected from the group consisting of Si, Ge, and a mixture thereof. The Group IV compound may be a binary compound selected from the group consisting of SiC, SiGe, and a mixture thereof.

In this case, the binary compound, the ternary compound, or the quaternary compound may exist in particles at a substantially uniform concentration, or a particle may contain concentrations of different compounds at different locations therein. Further, the color conversion media layer may have a core/shell structure where one quantum dot surrounds another quantum dot. An interface between the core and the shell may have a concentration gradient such that a concentration of an element existing in the shell is gradually reduced nearer to the center thereof.

For example, the quantum dot may have a core/shell structure including a core and a shell covering the core.

The core may include one or more materials selected from the group consisting of CdSe, CdS, ZnS, ZnSe, CdTe, CdSeTe, CdZnS, PbSe, AgInZnS, ZnTe, CdSeS, PbS, PbTe, HgS, HgSe, HgTe, GaN, GaP, GaAs, InP, InZnP, InGaP, InGaN, InAs, and ZnO, but is not limited thereto. The shell may include one or more materials selected from the group consisting of CdSe, ZnSe, ZnS, ZnTe, CdTe, PbS, TiO, SrSe, CdO, CdS, ZnO, InP, InS, GaP, GaN, GaO, InZnP, InGaP, InGaN, InZnSCdSe, and HgSe, but is not limited thereto.

An average particle diameter of the core of the core/shell quantum dot may be 2 nm to 5 nm. Meanwhile, an average thickness of the shell may be 3 nm to 5 nm. Thus, the average particle diameter of the quantum dot may be 5 nm to 10 nm. In the case where the core, the shell, and the quantum dot satisfy the aforementioned range of average particle diameter or average thickness, the quantum dot may exhibit behavior characteristic of a quantum dot, and may also have desired dispersibility. In the aforementioned range, light emitting colors of the quantum dot and/or semiconductor characteristics of the quantum dot and the like may be selected by variously selecting the particle diameter of the core, the average thickness of the shell, and the average particle diameter of the quantum dot.

Further, the quantum dot may have any shape but more specifically, it may be preferable to use forms such as spherical, pyramidal, multi-armed, or cubic nanoparticles, nanotubes, nanowires, nanofibers, and nanoplate-shaped particles.

The nanophosphor according to an exemplary embodiment of the present invention may be an inorganic phosphor, and the inorganic phosphor may include one or more of garnets, silicates, sulfides, oxides (oxynitrides), nitrides, and aluminates.

The inorganic phosphor may include one or more materials selected from a group including Y3Al5O12:Ce3+ (YAG:Ce), Tb3Al5O12:Ce3+(TAG:Ce), (Sr,Ba,Ca)2SiO4:Eu2+, (Sr,Ba,Ca,Mg,Zn)2Si, (OD)4:Eu2+(D=F,Cl,S,N,Br), Ba2MgSi2O7:Eu2+, Ba2SiO4:Eu2+, Ca3(Sc,Mg)2Si3O12:Ce3+, (Ca,Sr)S:Eu2+, (Sr,Ca)Ga2S4:Eu2+, SrSi2O2N2:Eu2+, SiAlON:Ce3+, β-SiAlON:Eu2+, Ca-α-SiAlON:Eu2+, Ba3Si6O12N2:Eu2+, CaAlSiN3:Eu2+, (Sr,Ca) AlSiN3:Eu2+, Sr2Si5N8:Eu2+, (Sr,Ba)Al2O4:Eu2+, (Mg,Sr)Al2O4:Eu2+, and BaMg2Al16O27:Eu2+.

The quantum dot tube 520 according to an exemplary embodiment of the present invention further includes an antioxidant. The antioxidant includes at least one compound among a phenol-based compound, a phosphorus-based compound, and a sulfur-based compound. When the antioxidant includes two compounds, the antioxidant includes the phenol-based compound and the phosphorus-based compound, the phosphorus-based compound and the sulfur-based compound, or the phenol-based compound and the sulfur-based compound.

Also, according to an exemplary embodiment of the present invention, the antioxidant includes the phenol-based compound, and in addition may include at least one of the phosphorus-based compound and the sulfur-based compound. The nanophosphor included in the quantum dot tube 520 may be degraded by heat generated in the process of manufacturing the quantum dot tube 520, such that its photoefficiency may be deteriorated. Also, the nanophosphor included in the quantum dot tube 520 may be oxidized by the gas generated in the process. However, like an exemplary embodiment of the present invention, when the quantum dot tube 520 further includes the antioxidant, oxidation of the nanophosphor is reduced or prevented, thereby maintaining or improving photoefficiency.

Examples of the phenol-based antioxidant may include 2,6-di-tert-butyl-p-cresol, 2,6-diphenyl-4-octadesiloxyphenol, stearyl(3,5-di-tert-butyl-4-hydroxyphenyl) propionate, distearyl(3,5-di-tert-butyl-4-hydroxybenzyl)phosphonate, tridecyl.3,5-di-tert-butyl-4-hydroxybenzyl thio acetate, thiodiethylenebis[(3,5-di-tert-butyl-4-hydroxyphenyl) propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]glycolester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis [methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethyleneglycolbis[β-(3-tert-butyl-4-hydroxy-5-methylphenyl) propionate], tocophenol, and the like.

Examples of the phosphorus-based antioxidant may include triphenyl phosphite, tris(2,4-di-tert-butylphenyl) phosphite, tris(2,5-di-tert-butylphenyl)phosphite, tris(nonylphenyl)phosphite, tris(dinonylphenyl)phosphite, tris(mono, di-mixed nonylphenyl)phosphite, diphenylacid phosphite, 2,2'-methylenebis(4,6-di-tert-butylphenyl)octyl phosphite, diphenyldecyl phosphite, diphenyloctyl phosphite, di(nonylphenyl)pentaerythritol diphosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis (neopentyl glycol).1,4-cyclohexanedimethyl diphosphite, bis(2,4-di-tert-butylphenyl)pentaerythritol diphosphite, bis (2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearylpentaerythritol diphosphite, tetra(C12-15 mixed-alkyl)-4,4'-isopropylidenediphenyl phosphite, bis[2,2'-methylenebis(4,6-diamylphenyl)].isopropylidenediphenyl phosphite, tetratridecyl.4,4'-butylidenebis(2-tert-butyl-5-methylphenol)diphosphite, hexa(tridecyl).1,1,3-tris(2-methyl-5-tert-butyl-4-hydroxyphenyl)butane.triphosphite, tetrakis(2,4-di-tert-butylphenyl)biphenylene diphosphonite, tris(2-[(2,4,7,9-tetrakis-tert-butyldibenzo[d,f][1,3,2]dioxaphosphepin-6-yl)oxy]ethyl)amine, 9,10-dihydro-9-oxa-10-phosphaphenanthrene-10-oxide, tris(2-[(2,4,8,10-tetrakis-tert-butyldibenzo[d,f][1,3,2]dioxaphosphepin-6-yl)oxy] ethyl)amine, 2-(1,1-dimethylethyl)-6-methyl-4-[3-[[2,4,8,10-tetrakis(1,1-dimethylethyl)dibenzo[d,f][1,3,2] dioxaphosphepin-6-yl]oxy]propyl]phenol2-butyl-2-ethylpropanediol.2,4,6-tri-tert-butylphenol monophosphite, and the like.

The sulfur-based antioxidant may use dialkylthiodipropionates, such as β-alkylmercaptopropionic acid esters of polyol, but embodiments are not limited thereto. Here, the dialkylthiodipropionate may be at least one among a dilauryl thiodipropionic acid, a dimyristyl thiodipropionic acid, a myristylstearyl thiodipropionic acid, and a distearylester thiodipropionic acid. Also, the β-alkylmercaptopropionic acid esters of polyol may be a pentaerythritoltetra(β-dodecyl mercaptopropionate), but is not limited thereto.

The antioxidant may be included in an amount of 1 to 20 wt % based on a total weight of a solid of the resin composition, and preferably 1 to 5 wt %. The embodiments, however, are not limited thereto.

The quantum dot tube 520 according to the exemplary embodiment of the present invention may include the aforementioned antioxidant to have desired heat resistance and chemical resistance. Accordingly, the nanophosphor included in the quantum dot tube 520 may be prevented from being damaged or quenched due to UV or heat generated during the manufacturing process.

Particularly, the phenol-based antioxidant has the desired effect of preventing the oxidation phenomena generated in exposure or coating (or depositing) of the resin composition. Furthermore, when the resin composition is hardened and then is mounted on the display device as the quantum dot tube 520, long-term oxidation phenomena due to gas or active oxygen may be suppressed through the sulfur-based compound or the phosphorus-based antioxidant.

The resin composition 520b according to an exemplary embodiment of the present invention may be a thermal hardening resin composition or a photosensitive resin composition including the above-described nanophosphor and antioxidant.

When the resin composition 520b is formed of the thermal hardening resin composition, the thermal hardening resin composition includes the thermal hardening resin, and the thermal hardening resin may use an epoxy resin, a phenol resin, a melamine resin, a urea resin, an unsaturated polyester resin, a silicone, a polyurethane, an allyl resin and a thermosetting acryl resin, a phenol-melamine polycondensation resin, a urea melamine polycondensation resin, and the like. However, the thermal hardening resin is not limited thereto.

When the resin composition 520b is formed of the photosensitive resin composition, the photosensitive resin composition may further include the photopolymerization initiator, the photopolymerization compound, and the solvent.

The photopolymerization initiator is a material serving to initiate cross-linking and curing reactions between photosensitive functional groups and photosensitive materials in the photosensitive resin composition, and one kind or more selected from acetophenone-based, benzoin-based, benzophenone-based, triazine-based, oxime-based, and thioxanthone-based photopolymerization initiators may be used.

Examples of the acetophenone-based photopolymerization initiator may include 4-phenoxy dichloroacetophenone, 4-t-butyl dichloroacetophenone, 4-t-butyl trichloroacetophenone, 2,2-diethoxyacetophenone, 2-hydroxy-2-methyl-1-phenylpropane-1-one, 1-(4-isopropylphenyl)-2-hydroxy-2-methyl-propane-1-one, 1-(4-dodecylphenyl)-2-hydroxy-2-methylpropane-1-one, 4-(2-hydroxyethoxy)-phenyl-(2-hydroxy-2-propyl)ketone, 1-hydroxycyclohexylphenylketone, 2-methyl-1-[4-(methylthio)phenyl]-2-morpholino-propane-1-one, and the like, but are not limited thereto.

As the benzoin-based photopolymerization initiator, benzoin, benzoin methyl ether, benzoin ethyl ether, benzoin isopropyl ether, benzoin isobutyl ether, benzyl dimethyl ketal, and the like may be used, but the benzoin-based photopolymerization initiator is not limited thereto.

Examples of the benzophenone-based photopolymerization initiator may include benzophenone, benzoyl benzoic acid, benzoyl benzoic acid methyl ester, 4-phenylbenzophenone, hydroxybenzophenone, 4-benzoyl-4'-methyldiphenyl sulphide, 3,3'-dimethyl-4-methoxybenzophenone, and the like, but are not limited thereto.

Examples of the triazine-based photopolymerization initiator may include 2,4,6-trichloro-s-triazine, 2-phenyl 4,6-bis(trichloromethyl)-s-triazine, 2-(3',4'-dimethoxystyryl)-4,6-bis(trichloromethyl)-s-triazine, 2-(4'-methoxynaphthyl)-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-biphenyl 4,6-bis(trichloromethyl)-s-triazine, bis(trichloromethyl)-6-styryl-s-triazine, 2-(naphtho-1-yl)-4,6-bis(trichloromethyl)-s-triazine, 2-(4-methoxynaphtho-1-yl)-4,6-bis(trichloromethyl)-s-triazine, 2-4-bis(trichloromethyl)-6-piperonyl-s-triazine, 2-4-bis(trichloromethyl)-6-(4-methoxystyryl)-s-triazine, and the like.

As the oxime-based photopolymerization initiator, an O-acyloxime-based compound, 2-(o-benzoyloxime)-1-[4-(phenylthio)phenyl]-1,2-octanedione, 1-(o-acetyloxime)-1-[9-ethyl-6-(2-methylbenzoyl)-9H-carbazole-3-yl]ethanone, 0-ethoxycarbonyl-α oxyamino-1-phenylpropane-1-one, and the like may be used. Specific examples of the O-acyloxime-based compound may include 1,2-octanedione, 2-dimethylamino-2-(4-methylbenzyl)-1-(4-morpholine-4-yl-phenyl)-butane-1-one, 1-(4-phenylsulfanylphenyl)-butane-1,2-dione 2-oxime-O-benzoate, 1-(4-phenylsulfanylphenyl)-octane-1,2-dione 2-oxime-O-benzoate, 1-(4-phenylsulfanylphenyl)-octane-1-one oxime-O-acetate, 1-(4-phenylsulfanylphenyl)-butane-1-one oxime-O-acetate, and the like.

Examples of the thioxanthone-based photopolymerization initiator may include thioxanthone, 2-chlorothioxanthone, 2-methylthioxanthone, isopropylthioxanthone, 2,4-diethylthioxanthone, 2,4-diisopropylthioxanthone, and the like.

The content of the photopolymerization initiator is not limited to the above, and may include any appropriate materials in any ranges, in consideration of initiation performance of the photopolymerization initiator, a size of a photosensitive resin pattern to be formed, and the like.

The photopolymerization compound may participate in cross-linking and curing reactions together with a photosensitive compound or a photosensitive functional group bonded to a surface of the nanophosphor during exposure, to serve to increase resolution of the photosensitive resin pattern and durability of a cured material.

As the photopolymerization compound, monofunctional or multi-functional esters of (meth)acrylic acid having at least one ethylenically unsaturated double bond may be used alone, or two kinds or more thereof may be used together.

The photopolymerization compound may have an ethylenically unsaturated double bond to cause sufficient polymerization during exposure in a process of forming the pattern and thus form the pattern having excellent heat resistance, light resistance, and chemical resistance.

Specific examples of the photopolymerization compound may include ethylene glycol di(meth)acrylate, diethylene glycol di(meth)acrylate, triethylene glycol di(meth)acrylate, propylene glycol di(meth)acrylate, neopentyl glycol di(meth)acrylate, 1,4-butanediol di(meth)acrylate, 1,6-hexanediol di(meth)acrylate, bisphenol A di(meth)acrylate, pentaerythritol di(meth)acrylate, pentaerythritol tri(meth)acrylate, pentaerythritol tetra(meth)acrylate, pentaerythritol hexa(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy(meth)acrylate, ethylene glycol monomethylether(meth)acrylate, trimethylol propane tri(meth)acrylate, tris(meth)acryloyloxyethyl phosphate, novolac epoxy(meth)acrylate, and the like.

The photopolymerization compound may be treated by an acid anhydride so that a superior developing property is provided.

Further, the photopolymerization compound may be a multi-functional acrylate-based compound or a multi-functional polyalkylene oxide or polysiloxane-based polymer including one or more of an acryl group and a vinyl group.

Examples of the photopolymerization compound may include urethane acrylate, allyloxylated cyclohexyl diacrylate, bis(acryloxyethyl)hydroxyl isocyanurate, bis(acryloxy-neopentylglycol) adipate, bisphenol A diacrylate, bisphenyl A dimethacrylate, 1,4-butanediol diacrylate, 1,4-butanediol dimethacrylate, 1,3-butyleneglycol diacrylate, 1,3-butyleneglycol dimethacrylate, dicyclopentanyl diacrylate, diethyleneglycol diacrylate, diethyleneglycol dimethacrylate, dipentaerythrol hexaacrylate, dipentaerythrol monohydroxy hexaacrylate, ditrimethylolprpane tetraacrylate, ethyleneglycol dimethacrylate, glyceol methacrylate, 1,6-hexanediol diacrylate, neopentylglycol dimethacrylate, neopentylglycol hydroxypivalate diacrylate, pentaerythritol triacrylate, pentaerythritol tetraacrylate, phosphoric acid dimethacrylate, polyethyleneglycol diacrylate, polypropyleneglycol diacrylate, tetraethyleneglycol diacrylate, tetrabromobisphenol A diacrylate, triethyleneglycol divinylether, triglycerol diacrylate, trimethylolpropane triacrylate, tripropyleneglycol diacrylate, tris(acryloxyethyl) isocyanurate, phosphoric acid triacrylate, phosphoric acid diacrylate, acrylic acid propargyl ester, polydimethylsiloxane having a vinyl group at a terminal thereof (vinyl-terminated polydimethylsiloxane), a diphenylsiloxane-dimethylsiloxane copolymer having a vinyl group at a terminal thereof (vinyl-terminated diphenylsiloxane-dimethylsiloxane copolymer), polyphenylmethylsiloxane having a vinyl group at a terminal thereof (vinyl-terminated polyphenylmethylsiloxane), a trifluoromethylsiloxane-dimethylsiloxane copolymer having a vinyl group at a terminal thereof (vinyl-terminated trifluoromethylsiloxane-dimethylsiloxane copolymer), a diethylsiloxane-dimethylsiloxane copolymer having a vinyl group at a terminal thereof (vinyl-terminated diethylsiloxane-dimethylsiloxane copolymer), vinylmethylsiloxane, polydimethyl siloxane having a monomethacryloxypropyl group at a terminal thereof (monomethacryloyloxypropyl-terminated polydimethyl siloxane), polydimethyl siloxane having a monovinyl group at a terminal thereof (monovinyl-terminated polydimethyl siloxane), or polyethylene oxide having a monoallyl group or a monotrimethylsiloxy group at a terminal thereof (monoallyl-monotrimethylsiloxy-terminated polyethylene oxide).

The content of the photopolymerization compound is not limited to the above, and any materials may be appropriately selected in consideration of photocuring properties (a curing speed, a cured film state, and the like), the bond number of photosensitive functional groups of the surface of the nanophosphor, and the like.

The photopolymerization compound may further include one or more materials selected from a cyanine-based material, a merocyanine-based material, an oxonol-based material, a phthalocyanine-based material, an azo-based material, a fluorene-based material, a thiophene-based material, a diphenylethene-based material, and a phenoxazine-based material in order to form a precise pattern, but is not limited thereto.

Further, as the solvent that may be included in the photosensitive resin composition, ethyleneglycol acetate, ethylcellosolve, propyleneglycolmethylether acetate, ethyl lactate, polyethyleneglycol, cyclohexanone, propyleneglycolmethylether, and the like may be used.

Also, the photosensitive resin composition may further include a dispersant, a non-ionic dispersant, an ionic dispersant, or a cationic dispersant. For example, polyalkylene glycol and ester thereof; polyoxyalkylene; a polyalcohol ester alkylene oxide addition; an alcohol alkylene oxide addition; and the like may be used alone or used while being appropriately combined.

The dispersant is an added material that disperses the nanophosphor in the solvent to make a more stable suspension.

The light guide 530 includes incident light surface 530a where the light emitted from the light-emitting device 510a falls incident after it passes through the quantum dot tube 520. Light guide 530 also includes emission light surface 530b for substantially uniformly emitting the light incident through the incident light surface 530a. The light guide 530 substantially uniformly transmits the light emitted from the light-emitting device 510a and the quantum dot tube 520 toward the display panel 10. That is, when the display panel 10 is positioned on the light assembly 500 and forms the display device, the light guide 530 substantially uniformly emits the light incident to the incident light surface 530a to the emission light surface 530b, to be substantially uniformly transmitted toward the display panel 10.

The light assembly 500 according to an exemplary embodiment of the present invention may further include the reflector 540 positioned at the rear of the light guide 530.

The reflector 540 changes a light path of the light emitted from the light-emitting device 510a back toward the display panel 10, to prevent light leakage. That is, when the light emitted from the light-emitting device 510a is emitted toward the bottom surface of the light guide 530, the reflector 540 reflects the light back into the light guide 530.

The optical sheet 560 may be positioned on the light guide 530 and may be omitted according to an exemplary embodiment. The optical sheet 560 positioned on the light guide 530 diffuses the light emitted from the light guide 530, thereby serving to make luminance distribution more uniform.

The optical sheet is not limited to this function, and any sheet may be included. The optical sheet may include one layer or a plurality of layers, or may be omitted, and a protecting sheet having other characteristics may be further included.

Figure 4:
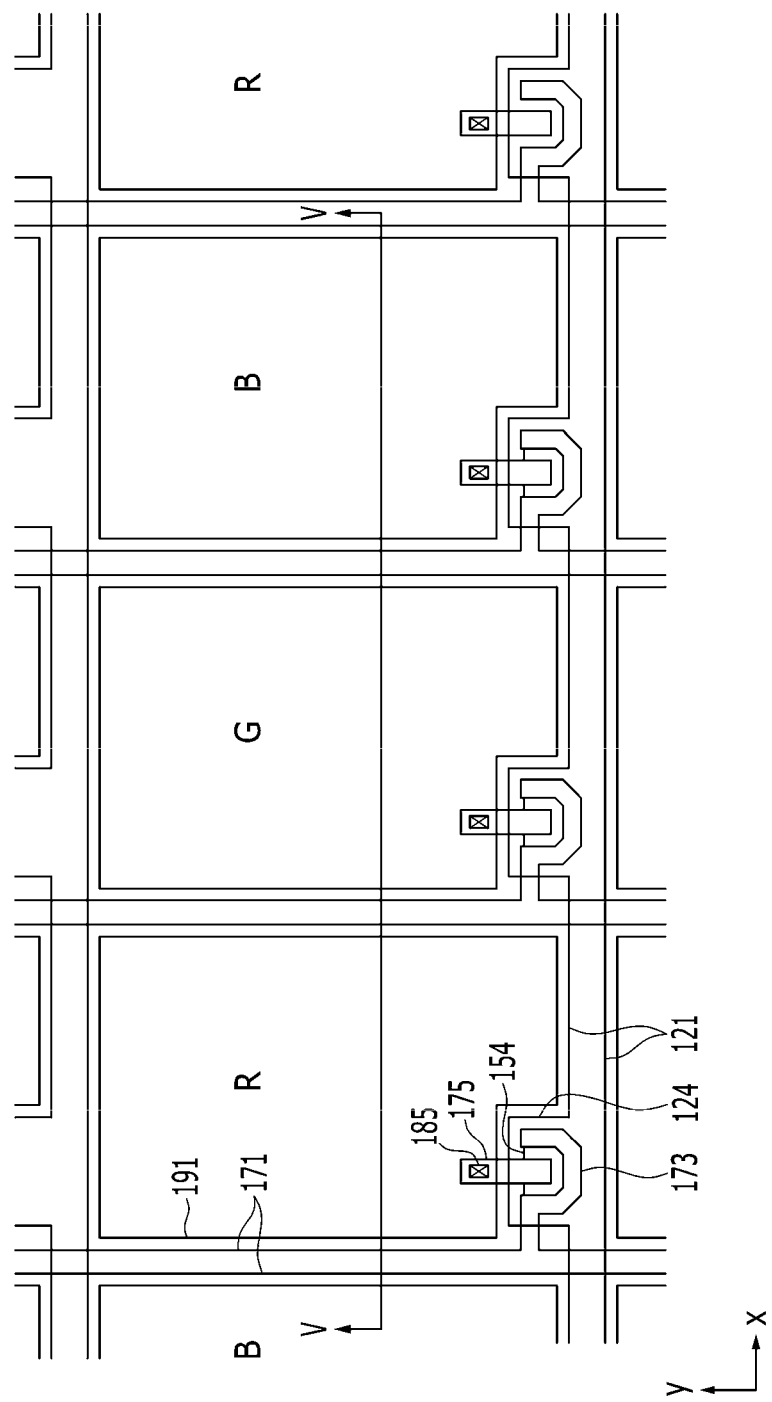
FIG. 4 is a top plan view of a plurality of pixels according to an exemplary embodiment of the present invention.
Figure 5:
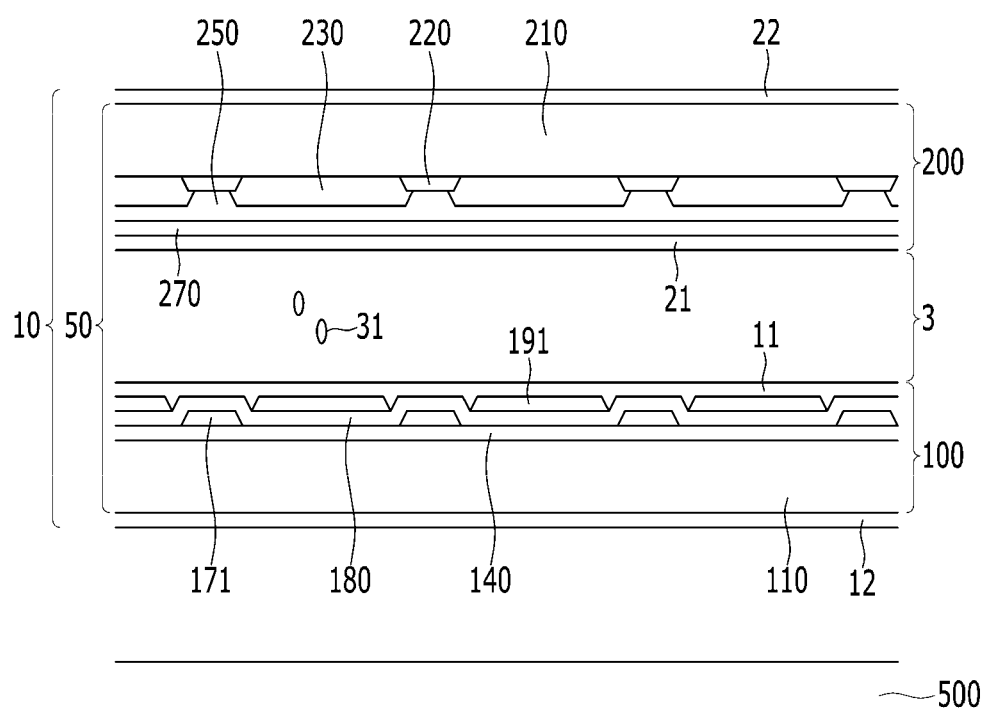
FIG. 5 is a cross-sectional view taken along a line V-V of FIG. 4.

Next, the liquid crystal display according to an exemplary embodiment of the present invention will be described with reference to FIG. 4 and FIG. 5. FIG. 4 is a top plan view of a plurality of pixels according to an exemplary embodiment of the present invention, and FIG. 5 is a cross-sectional view taken along a line V-V of FIG. 4.

The display panel 10 according to an exemplary embodiment of the present invention will be described in detail with reference to FIG. 4 and FIG. 5.

The display panel 10 may include a liquid crystal panel 50 representing the image, and polarizers 12 and 22 on respective surfaces of the liquid crystal panel 50. The first polarizer 12 and the second polarizer 22 polarize light incident from the light assembly 500, and are positioned at respective surfaces of the liquid crystal panel 50.

The polarizers 12 and 22 may use at least one among a triacetate cellulose (TAC) film, a polycarbonate (PC) film, a polyvinyl acetate (PVA) film, a wire grid polarizer, and an anisotropic mineral substrate such as a calcite. Also, these polarizers 12 and 22 are described as being formed of a film, however they may be positioned on one surface of the display panel through various methods such as coating and drying, or as an attachment. However, this description is an example, and embodiments are not limited thereto.

The liquid crystal panel 50 includes a lower panel 100 including a thin film transistor to display the image, an upper panel 200 including a second insulation substrate 210 facing the lower panel 100, and a liquid crystal layer 3 interposed between the lower panel 100 and the upper panel 200.

A plurality of pixel electrodes is positioned in a matrix arrangement on a first substrate 110 included in the lower panel 100.

A gate line 121 extends in a row direction and includes a gate electrode 124. A gate insulating layer 140 is positioned on the gate line 121, a semiconductor layer 154 is positioned on the gate insulating layer 140, and a data line 171 is positioned on the semiconductor layer 154 while extending in a column direction and including a source electrode 173. A drain electrode 175, a passivation layer 180 positioned on the data line 171 and the drain electrode 175, and a pixel electrode 191 electrically and physically connected to the drain electrode 175 through a contact hole 185 are then positioned on the first substrate 110.

The semiconductor layer 154 positioned on the gate electrode 124 forms a channel layer in a region that is exposed by the source electrode 173 and the drain electrode 175. Thus, the gate electrode 124, the semiconductor layer 154, the source electrode 173, and the drain electrode 175 form one thin film transistor.

A first alignment layer 11 is formed on the pixel electrode 191. The first alignment layer 11 may be formed as a vertical alignment layer, and may be made of alignment materials such as polyamic acid, polysiloxane, and polyimide.

Next, the upper panel 200 will be described.

The second substrate 210 faces and is separated from the first substrate 110. A light blocking member 220, a color filter 230, a planarization layer 250, and a common electrode 270 are positioned between the second substrate 210 and the liquid crystal layer 3.

In detail, the light blocking member 220 is positioned on one surface of the second substrate 210 facing the first substrate 110. The color filter 230 is positioned on the same surface of the second substrate 210 and may display the primary colors. Examples of the primary colors include red, green, and blue, or yellow, cyan, magenta, and the like Although not shown in the drawings, the color filter may further include a color filter displaying a mixed color that is a mixture of the primary colors, or white in addition to the primary colors.

The planarization layer 250 is positioned on one surface of the light blocking member 220 and the color filter 230 facing the first substrate 110, and the planarization layer 250 may provide a flat surface. The common electrode 270 is positioned on the planarization layer 250 to face the first substrate 110. The planarization layer 250 may be omitted according to an exemplary embodiment.

The common electrode 270 receives a common voltage and forms an electric field with the pixel electrode 191 to arrange liquid crystal molecules 31 positioned in the liquid crystal layer 3 between the common electrode 270 and the pixel electrode 191.

A second alignment layer 21 may be positioned on one surface of the common electrode 270 facing the first substrate 110. The second alignment layer 21 may be made of the same or a similar material to that of the first alignment layer 11, and may be formed through the same process.

As described above, the upper panel 200 is disposed over the lower panel 100 so that the second substrate 210 is positioned on the outer side of the liquid crystal panel 50. That is, the second substrate 210 may be disposed outside the lower panel 100.

The liquid crystal layer 3 includes a plurality of liquid crystal molecules 31, and an arrangement direction of the liquid crystal molecules 31 is controlled by an electric field between the pixel electrode 191 and the common electrode 270. According to arrangement of the liquid crystal molecules, transmittance of light received from the light assembly 500 may be controlled to display an image.

The above-described display device provides improved color reproducibility and contrast ratio through the light assembly shown in FIG. 2 or FIG. 3.

Figure 6:
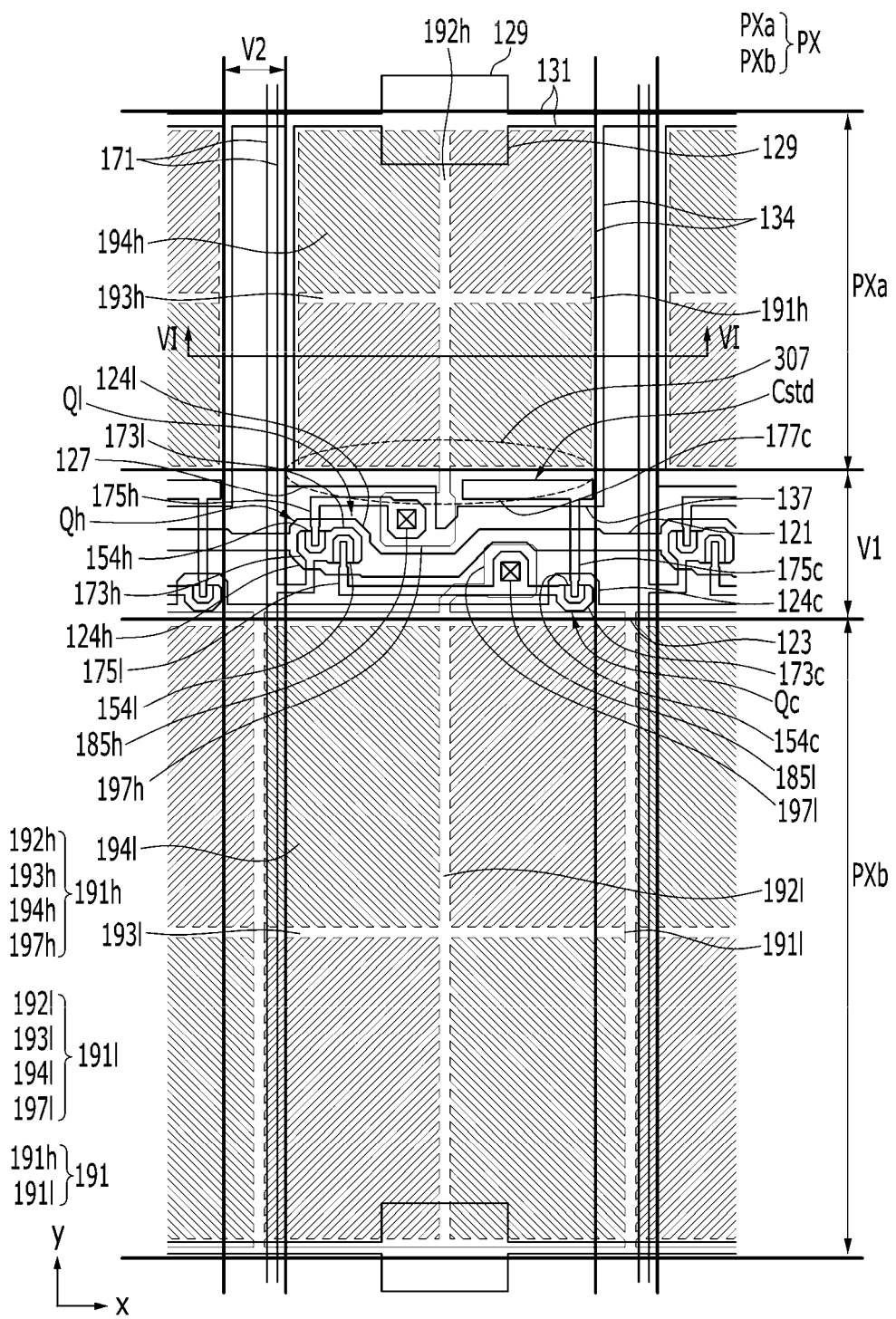
FIG. 6 is a top plan view of a pixel according to an exemplary embodiment of the present invention.
Figure 7:
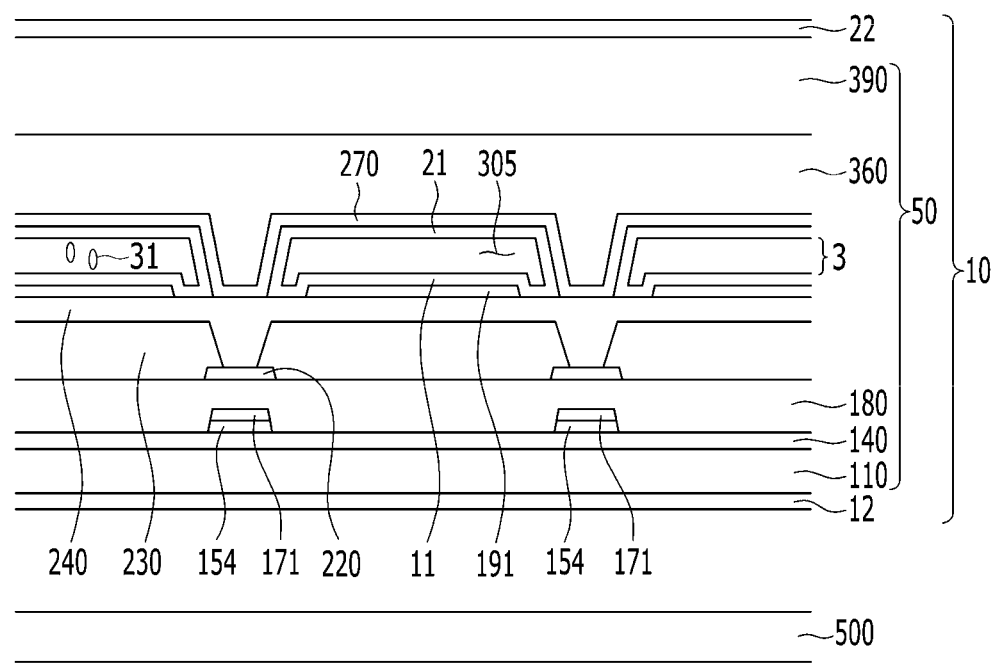
FIG. 7 is a cross-sectional view taken along a line VI-VI of FIG. 6.

Next, the liquid crystal display according to an exemplary embodiment of the present invention will be described with reference to FIG. 6 and FIG. 7. FIG. 6 is a top plan view of a pixel according to an exemplary embodiment of the present invention, and FIG. 7 is a cross-sectional view taken along a line VI-VI of FIG. 6. The description of the same or similar constituent elements as the above-described constituent elements is omitted.

The display panel 10 may include a liquid crystal panel 50 displaying an image, and polarizers 12 and 22 positioned on respective surfaces of the liquid crystal panel 50. A first polarizer 12 and a second polarizer 22 for polarization of the light incident from the light assembly 500 are positioned at respective opposing surfaces of the liquid crystal panel 50.

The liquid crystal panel 50 includes a plurality of gate conductors including a plurality of gate lines 121, a plurality of step-down gate lines 123, and a plurality of storage electrode lines 131 positioned on the substrate 110.

The gate lines 121 and the step-down gate lines 123 transfer gate signals, and mainly extend in a transverse direction. The gate conductor includes a first gate electrode 124h and a second gate electrode 124l protruding upward and downward from the gate line 121, and further includes a third gate electrode 124c protruding upward from the step-down gate line 123. The first gate electrode 124h and the second gate electrode 124l are connected with each other to form one protrusion. The shapes of the first, second, and third gate electrodes 124h, 124l, and 124c may be modified.

The storage electrode line 131 mainly extends in a horizontal direction and transfers a predetermined voltage such as a common voltage Vcom. The storage electrode line 131 includes storage electrodes 129 protruding upward and downward from the storage electrode line 131, a pair of vertical portions 134 extending downward to be substantially perpendicular to the gate line 121, and a horizontal portion 127 connecting ends of the pair of vertical portions 134. The horizontal portion 127 includes a capacitor electrode 137 expanded downward.

A gate insulating layer 140 is formed on the gate conductors 121, 123, 124h, 124l, 124c, and 131. The gate insulating layer 140 may be made of an inorganic insulating material such as a silicon nitride (SiNx) and a silicon oxide (SiOx). Further, the gate insulating layer 140 may be formed as a single layer or multiple layers.

A first semiconductor 154h, a second semiconductor 154l, and a third semiconductor 154c are formed on the gate insulating layer 140. The first semiconductor 154h may be positioned on the first gate electrode 124h, the second semiconductor 154l may be positioned on the second gate electrode 124l, and the third semiconductor 154c may be positioned on the third gate electrode 124c. The first semiconductor 154h and the second semiconductor 154l may be connected to each other, and the second semiconductor 154l and the third semiconductor 154c may also be connected to each other. In this case, the first semiconductor 154h may be extended to a lower portion of the data line 171. The first to third semiconductors 154h, 154l, and 154c may be made of amorphous silicon, polycrystalline silicon, a metal oxide, and the like.

An ohmic contact (not illustrated) may be further formed on each of the first to third semiconductors 154h, 154l, and 154c. The ohmic contact may be made of a silicide or a material such as n+ hydrogenated amorphous silicon in which an n-type impurity is doped at a high concentration.

A data conductor including a data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transfers a data signal, and mainly extends in a vertical direction to cross the gate line 121 and the step-down gate line 123. Each data line 171 extends toward the first gate electrode 124h and the second gate electrode 124l, and includes the first source electrode 173h and the second source electrode 173l which are connected with each other.

Each of the first drain electrode 175h, the second drain electrode 175l, and the third drain electrode 175c includes one wide end portion and an opposite rod-shaped end portion. The rod-shaped end portions of the first drain electrode 175h and the second drain electrode 175l are partially surrounded by the first source electrode 173h and the second source electrode 173l, respectively. One wide end portion of the second drain electrode 175l is again extended to form the third source electrode 173c which is bent in a 'U' shape. A wide end portion 177c of the third drain electrode 175c overlaps the capacitor electrode 137 to form a step-down capacitor Cstd, and the rod-shaped end portion is partially surrounded by the third source electrode 173c.

The first gate electrode 124h, the first source electrode 173h, and the first drain electrode 175h form a first thin film transistor Qh together with the first semiconductor 154h. The second gate electrode 124l, the second source electrode 173l, and the second drain electrode 175l form a second thin film transistor Ql together with the second semiconductor 154l, and the third gate electrode 124c, the third source electrode 173c, and the third drain electrode 175c form the third thin film transistor Qc together with the third semiconductor 154c.

The first semiconductor 154h, the second semiconductor 154l, and the third semiconductor 154c are connected to each other to be formed in a linear shape, and may have substantially the same plan-view shape as the data conductors 171, 173h, 173l, 173c, 175h, 175l, and 175c and the ohmic contacts therebelow, except for channel regions between the source electrodes 173h, 173l, and 173c and the drain electrodes 175h, 175l, and 175c.

In the first semiconductor 154h, an exposed portion which is not covered by the first source electrode 173h and the first drain electrode 175h is disposed between the first source electrode 173h and the first drain electrode 175h. In the second semiconductor 154l, an exposed portion which is not covered by the second source electrode 173l and the second drain electrode 175l is disposed between the second source electrode 173l and the second drain electrode 175l. In addition, in the third semiconductor 154c, an exposed portion which is not covered by the third source electrode 173c and the third drain electrode 175c is disposed between the third source electrode 173c and the third drain electrode 175c.

A passivation layer 180 is formed on the data conductors 171, 173h, 173l, 173c, 175h, 175l, and 175c and the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed as a single layer or multiple layers.

A light blocking member 220 and a color filter 230 are positioned on the passivation layer 180.

The light blocking member 220 is formed at the boundary of the pixel area PX and the thin film transistor to prevent light leakage, and the color filter 230 overlaps the pixel electrode 191, thereby uniquely displaying one of the primary colors. Each color filter 230 may display one of the primary colors, for example, one of red, green, and blue, or yellow, cyan, and magenta. Although not shown, the color filters may further include a color filter displaying a mixture of the primary colors, or white as well as one or more of the primary colors.

A first insulating layer 240 may be positioned on the light blocking member 220 and the color filter 230. The first insulating layer 240 may be made of an inorganic insulating material such as SiNx, SiOx, and/or SiOxNy. The first insulating layer 240 serves to protect the light blocking member 220 when it is made of an organic material, and may be omitted if necessary.

The first insulating layer 240, the light blocking member 220, and the passivation layer 180 have a plurality of first contact holes 185h and a plurality of second contact holes 185l respectively exposing the wide end of the first drain electrode 175h and the wide end of the second drain electrode 175l.

Next, a pixel electrode 191 is positioned on the first insulating layer 240. The pixel electrode 191 may be made of a transparent metal material such as indium tin oxide (ITO) and/or indium zinc oxide (IZO).

The pixel electrode 191 is divided into a first subpixel electrode 191h and a second subpixel electrode 191l that are disposed at upper and lower parts of the pixel area, which are designated based on opposing sides of the gate line 121 and the step-down gate line 123 and which are adjacent to each other in a column direction. That is, the first and second subpixel electrodes 191h and 191l are separated from each other while interposing a first valley V1 therebetween, the first subpixel electrode 191h is positioned in a first subpixel area PXa, and the second subpixel electrode 191l is positioned in a second subpixel area PXb.

The first and second subpixel electrodes 191h and 191l are connected to the first and second drain electrodes 175h and 175l through the first and second contact holes 185h and 185l, respectively. Accordingly, when the first and second thin film transistors Qh and Ql are turned on, they receive data voltages from the first and second drain electrodes 175h and 175l, respectively.

Each of the first and second subpixel electrodes 191h and 191l roughly has a quadrangular shape, and the first and second subpixel electrodes 191h and 191l also include a cross-shaped stem portion consisting of horizontal stem portions 193h and 193l and vertical stem portions 192h and 192l that cross the horizontal stem portions 193h and 193l, respectively. In addition, the first and second subpixel electrodes 191h and 191l include a plurality of minute branch portions 194h and 194l, and protruding portions 197h and 197l protruding downward or upward from edge sides of the first and second subpixel electrodes 191h and 191l, respectively.

The pixel electrode 191 is divided into four subregions by the horizontal stem portions 193*h* and 193*l* and the vertical stem portions 192*h* and 192*l*. The minute branch portions 194*h* and 194*l* obliquely extend from the horizontal stem portions 193*h* and 193*l* and the vertical stem portions 192*h* and 192*l*, and may form an angle of about 45 to 135 degrees with respect to the gate line 121 or the horizontal stem portions 193*h* and 193*l* in their directions of extension. Further, directions in which the minute branch portions 194*h* and 194*l* of the two adjacent subregions extend may be perpendicular to each other, although this need not necessarily be the case.

The arrangement of the pixel area, the structure of the thin film transistor, and the shape of the pixel electrode that are described above are nonlimiting examples. The present invention is not limited thereto, but may instead be variously modified.

A common electrode 270 is formed on the pixel electrode 191 such that it is spaced apart from the pixel electrode 191 by a predetermined distance. A microcavity 305 is formed between the pixel electrode 191 and the common electrode 270. That is, the microcavity 305 is surrounded by the pixel electrode 191 and the common electrode 270. A width and an area of the microcavity 305 may be variously modified according to a size and resolution of the display device.

The common electrode 270 may be made of a transparent metallic material such as indium tin oxide (ITO), indium zinc oxide (IZO), etc. The common electrode 270 may receive a predetermined voltage, and an electric field may thereby be generated between the pixel electrode 191 and the common electrode 270.

A first alignment layer 11 is formed on the pixel electrode 191. A second alignment layer 21 is formed under the common electrode 270 to face the first alignment layer 11.

The first and second alignment layers 11 and 21 may be formed as vertical alignment layers, and may be made of an alignment material such as polyamic acid, polysiloxane, polyimide, etc. The first and second alignment layers 11 and 21 may be connected to each other at edges of the pixel area PX.

A liquid crystal layer including liquid crystal molecules 31 is positioned in a plurality of microcavities 305 between the pixel electrode 191 and the common electrode 270. The liquid crystal molecules 31 have negative dielectric anisotropy, and when no electric field is applied, may be aligned in a direction perpendicular to the substrate 110. That is, vertical orientation may be generated.

The first subpixel electrode 191*h* and the second subpixel electrode 191*l* to which the data voltage is applied generate an electric field together with the common electrode 270, so as to determine an orientation of the liquid crystal molecules 31 disposed in the microcavity 305 between the two electrodes 191 and 270. Luminance of light which passes through the liquid crystal layer may vary depending on the orientation of the liquid crystal molecules 31 determined as described above.

A roof layer 360 is positioned on the common electrode 270. The roof layer 360 may be made of the organic material or the inorganic material. The microcavity 305 is formed below the roof layer 360, and the roof layer 360 may be hardened by a hardening process to maintain the shape of the microcavity 305. That is, the roof layer 360 is spaced apart from the pixel electrode 191 to form the microcavity 305 therebetween.

The roof layer 360 is positioned in each pixel area PX and partition part V2, and is not positioned in the liquid crystal injection hole formation region V1. That is, the roof layer 360 is not positioned, i.e. absent or removed from, between the first subpixel area PXa and the second subpixel area PXb. The microcavity 305 is formed below each roof layer 360 in the first and second subpixel areas PXa and PXb. In the partition part V2, the microcavity 305 is not present, the roof layer 360 is protruded downward to form the partition part V2, and the partition part V2 may thus divide adjacent microcavities 305. Accordingly, a thickness of the roof layer 360 positioned at the partition part V2 may be larger than a thickness of the roof layer 360 positioned in each of the first subpixel area PXa and the second subpixel area PXb.

An injection hole (not shown) exposing a part of the microcavity 305 is formed in the common electrode 270 and the roof layer 360. Injection holes may be formed to face each other at edges of the first subpixel area PXa and the second subpixel area PXb. That is, each injection hole may be formed such that it corresponds to a lower side of the first subpixel area PXa and an upper side of the second subpixel area PXb so as to expose lateral sides of the microcavity 305. Since the microcavity 305 is exposed by the injection hole, an aligning agent or a liquid crystal material may be injected into the microcavity 305 through the injection hole. After injecting the aligning agent or the liquid crystal material, the injection hole may be filled with the liquid crystal material or may be sealed by an overcoat that will be described below.

An overcoat 390 may be formed on the roof layer 360. The overcoat 390 is positioned to cover the injection holes formed in the liquid crystal injection hole formation region V1 where the liquid crystal material and an alignment material are injected. That is, the overcoat 390 may seal the microcavity 305 such that the liquid crystal molecules 31 formed in the microcavity 305 are not discharged to the outside. Since the overcoat 390 contacts the liquid crystal molecules 31, the overcoat 390 may be made of a material that is not reactive with the liquid crystal molecules 31.

The overcoat 390 may consist of multiple layers such as a double layer and a triple layer. The double layer consists of two layers that are made of different materials. The triple layer consists of three layers, and materials of adjacent layers are different from each other. For example, the overcoat 390 may include a layer that is made of an organic insulating material and a layer that is made of an inorganic insulating material.

The display device according to an exemplary embodiment of the present invention is improved in terms of contrast ratio and color reproducibility, thereby providing a display device with excellent display quality, and only one sheet substrate is used, thereby simplifying the manufacturing process and the structure.

An exemplary embodiment of the present invention and a comparative example will be described with reference to FIG. 8 to FIG. 11. FIG. 8, FIG. 9, FIG. 10, and FIG. 11 are light intensity analysis graphs for an exemplary embodiment of the present invention and a comparative example.

Figure 8:
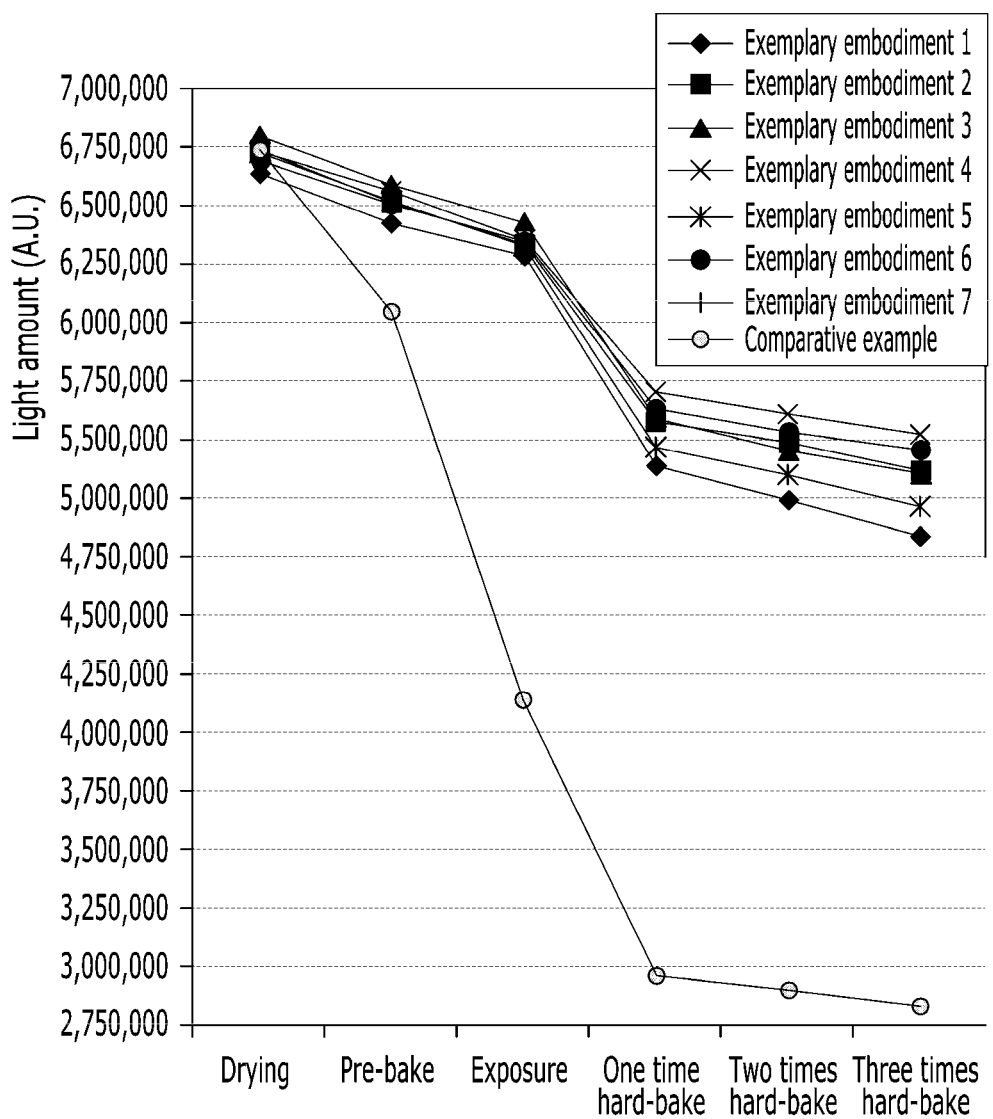
FIG. 8, FIG. 9, FIG. 10, and FIG. 11 are light intensity analysis graphs for an exemplary embodiment of the present invention and a comparative example.
Figure 9:
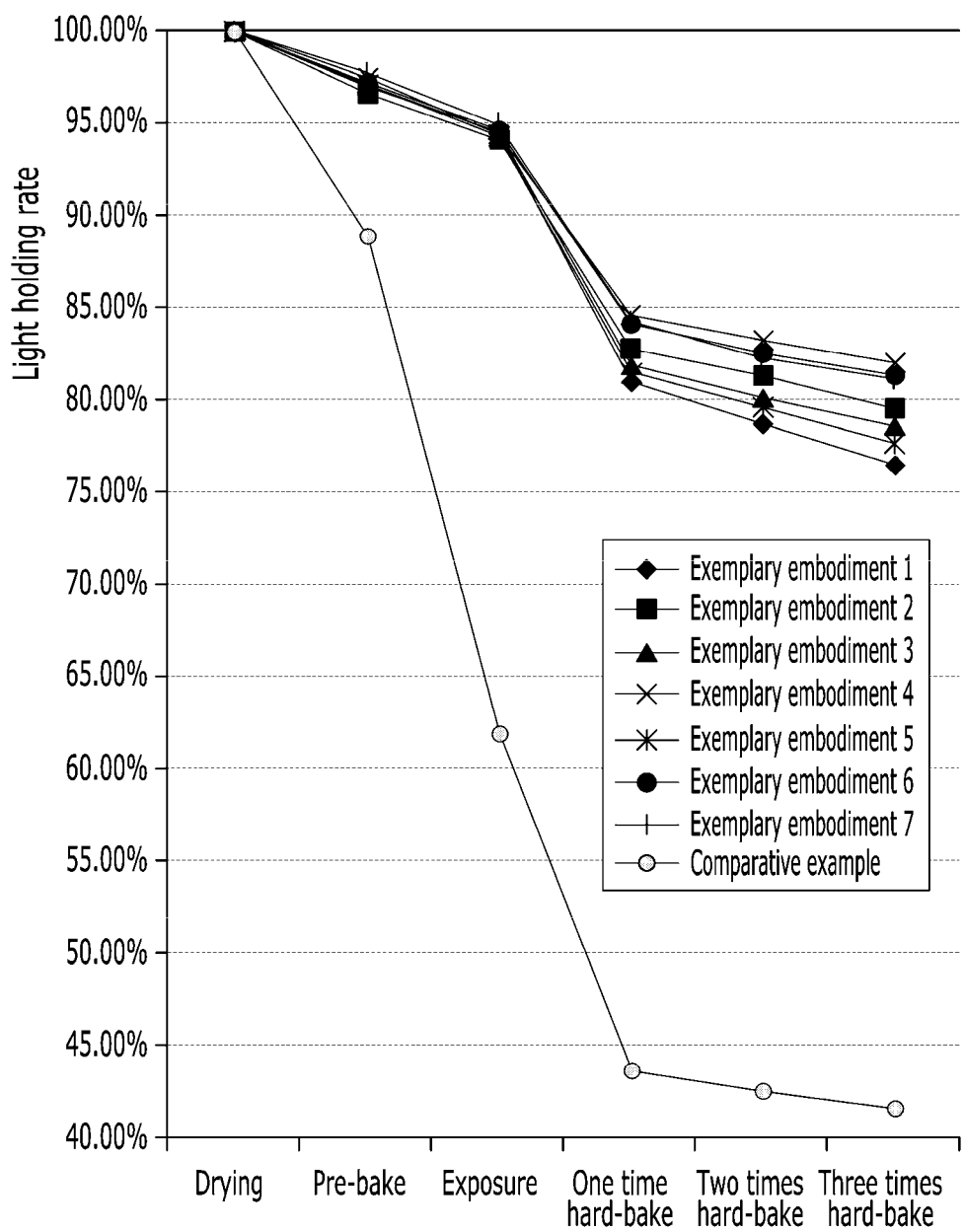

First, FIG. 8 and FIG. 9 show graphs of measurements of a light retention rate and light intensity, for a photosensitive resin composition including the green quantum dot according to an exemplary embodiment of the present invention, and for the comparative example.

To measure the photoefficiency of the photosensitive resin composition according to an exemplary embodiment of the present invention, the light retention rate and the light intensity of a green wavelength band (about 525 nm) are measured after performing the deposition process of the photosensitive resin composition.

In the deposition process, the photosensitive resin composition is coated on the substrate and is dried at room temperature (15-25° C.) for 4 h, and then is pre-baked for 3 min at 100° C., and a UV exposure process at 400 mJ and a hard-bake process at 180° C. for 30 min are performed. In this case, for the comparative example and the exemplary embodiment, the hard-bake process is performed three times in order to check the light retention amount under severe conditions.

First, in FIG. 8 and FIG. 9, Exemplary Embodiment 1 relates to a photosensitive resin composition that includes a phenol-based compound as the antioxidant; Exemplary Embodiment 2 to Exemplary Embodiment 5 relate to a photosensitive resin composition in which the phenol-based and phosphorus-based compounds are mixed at different ratios; and Exemplary Embodiment 6 and Exemplary Embodiment 7 relate to a photosensitive resin composition including an antioxidant in which the phenol-based, the phosphorus-based, and the sulfur-based compounds are mixed. Also, the comparative example is the case of using the photosensitive resin composition without an antioxidant.

Here, each antioxidant used in Exemplary Embodiment 1 to Exemplary Embodiment 7 is manufactured according to the mixture ratio as in Table 1 for the total antioxidant weight, and the phosphorus-based compound used in Experimental Example 3 and Experimental Example 5 is included at the same content, however different phosphorus-based compounds are used.

TABLE 1

| | Phenol-based (wt %) | Phosphorus-based (wt %) | Sulfur-based (wt %) |
|---|---|---|---|
| Exemplary Embodiment 1 | 100 | — | — |
| Exemplary Embodiment 2 | 70 | 30 | — |
| Exemplary Embodiment 3 | 50 | 50 | — |
| Exemplary Embodiment 4 | 30 | 70 | — |
| Exemplary Embodiment 5 | 50 | 50 | — |
| Exemplary Embodiment 6 | 40 | 50 | 10 |
| Exemplary Embodiment 7 | 30 | 50 | 20 |

First, referring to the exemplary embodiments of FIG. 8, after finishing the patterning process of the photosensitive resin composition, the light intensity of the green wavelength band is deteriorated by about 20% in all of Exemplary Embodiment 1 to Exemplary Embodiment 7. Further, referring to the exemplary embodiments of FIG. 9, a light retention rate of more than 75% appears in Exemplary Embodiments 1 to 7.

However, in FIG. 8 and FIG. 9, referring to the comparative example of a photosensitive resin composition without antioxidant, the light retention rate is reduced to about 41% according to the progression of the process. That is, referring to Exemplary Embodiments 1 to 7 and the comparative example, it may be confirmed that the light retention rate has a difference of about 40% or more after manufacture.

Figure 10:
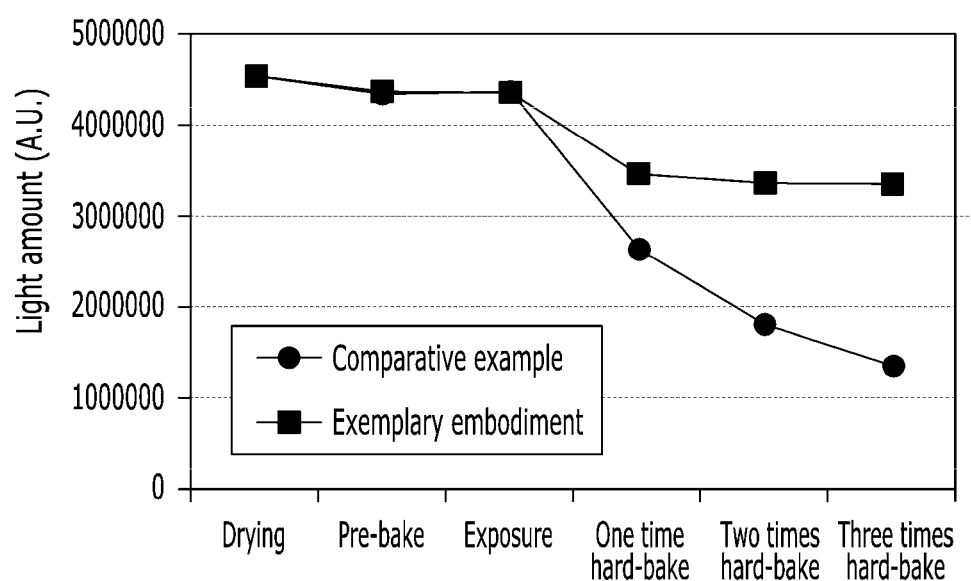
Figure 11:
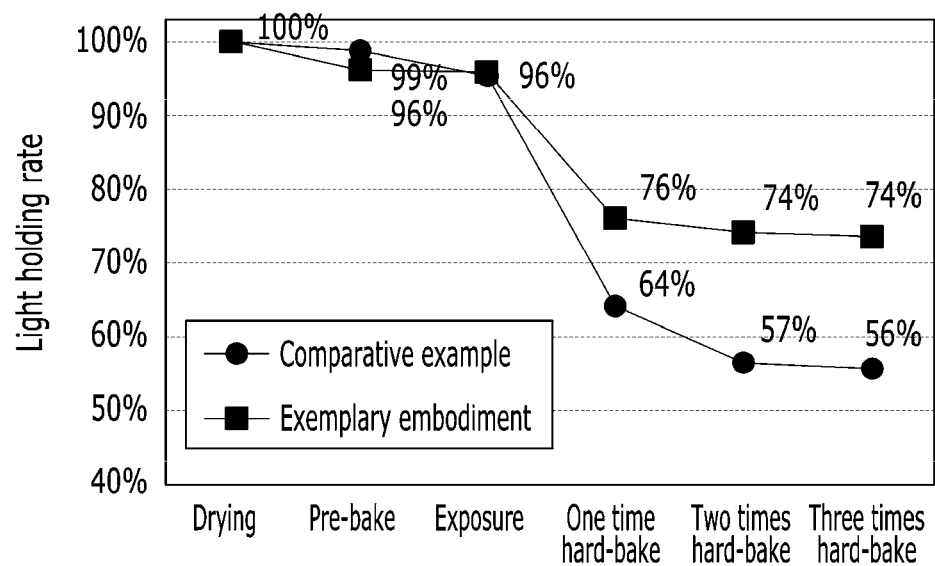

Next, the oxidation degree of red quantum dots of exemplary embodiments of the present invention and of the comparative example will be described with reference to FIG. 10 and FIG. 11. FIG. 10 and FIG. 11 are graphs showing the light intensity and the light retention rate at different process stages, for photosensitive resin compositions including red quantum dots according to exemplary embodiments of the present invention, and for the comparative example.

To measure the photoefficiency of the photosensitive resin composition according to an exemplary embodiment of the present invention, the light retention rate and the light intensity of the red wavelength band (about 625 nm) are respectively measured after the deposition process of the photosensitive resin composition. The deposition process for FIG. 10 and FIG. 11 has the same process conditions and order as those of FIG. 8 and FIG. 9.

In the measuring of the light retention rate of the red wavelength band, the exemplary embodiments use photosensitive resin compositions including a phenol-based antioxidant, and the comparative example uses a photosensitive resin composition without an antioxidant.

Referring to FIG. 10 and FIG. 11, after finishing the patterning process of the photosensitive resin composition, the light intensity and the light retention rate for the exemplary embodiment are about 74% compared with initial light of the red wavelength band.

In contrast, referring to an experiment result of the comparative example, after finishing the patterning process of the photosensitive resin composition, the light intensity and the light retention rate of the red wavelength band are about 56% of the initial light, and a difference of the light retention rate of about 20% appears compared with the exemplary embodiment including antioxidant.

That is, through the exemplary embodiments and the comparative example of FIG. 8 to FIG. 11, it may be confirmed that a photosensitive resin composition including antioxidant improves light intensity and light retention rate.

As described above, by adding an antioxidant to a resin composition including nanophosphor according to an exemplary embodiment of the present invention, the extinction phenomenon due to damage of the nanophosphor may be prevented, thereby obtaining improved photoefficiency and color reproducibility of the display device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

<Description of symbols>

| | |
|---|---|
| 1: display device | 10: display panel |
| 50: liquid crystal panel | 500: light assembly |
| 510: light-emitting device assembly | 520: quantum dot tube |
| 550: quantum dot sheet | |

What is claimed is:

1. A liquid crystal display comprising:
a display panel; and
a light assembly configured to provide light to the display panel;
wherein the light assembly includes:
a light-emitting device configured to emit first light;
a light guide positioned to receive the first light; and
a quantum dot sheet positioned on the light guide and positioned to receive the first light from the light guide, the quantum dot sheet configured to emit second light responsive to the received first light,
wherein the quantum dot sheet includes a nanophosphor and an antioxidant, and wherein the antioxidant includes a phenol-based compound, and further includes at least one of a phosphorus-based compound and a sulfur-based compound.

2. The liquid crystal display of claim 1, wherein the nanophosphor includes at least one of a quantum dot and an inorganic phosphor.

3. The liquid crystal display of claim 2, wherein the nanophosphor includes the-quantum dot, and the quantum dot includes a first quantum dot configured to emit red light and a second quantum dot configured to emit green light.

4. The liquid crystal display of claim 1, wherein the quantum dot sheet further includes at least one of a photopolymerization compound, a photopolymerization initiator, and a dispersant.

5. The liquid crystal display of claim 1, wherein the quantum dot sheet includes a thermal hardening resin.

6. The liquid crystal display of claim 1, wherein the light-emitting device includes a blue light emitting diode (LED).

7. The liquid crystal display of claim 1, wherein the display panel includes:
a liquid crystal panel, and
polarizers positioned on opposing surfaces of the liquid crystal panel.

8. The liquid crystal display of claim 7, wherein the liquid crystal panel includes:
a first substrate,
a transistor positioned on the first substrate,
a pixel electrode connected to the transistor,
a common electrode positioned to form an electric field along with the pixel electrode,
a second substrate facing the first substrate to be separated therefrom, and
a liquid crystal layer positioned between the first substrate and the second substrate.

9. The liquid crystal display of claim 1, further comprising:
an optical sheet positioned between the light guide and the display panel.

10. A liquid crystal display comprising:
a display panel; and
a light assembly configured to provide light to the display panel;
wherein the light assembly includes:
a light-emitting device configured to emit first light;
a light guide including an incident light surface; and
a quantum dot tube positioned between the light-emitting device and the incident light surface, the quantum dot tube configured to receive the first light, to emit second light responsive to the received first light, and to direct the second light toward the incident light surface,
wherein the quantum dot tube includes a nanophosphor and an antioxidant, and
wherein the antioxidant includes a phenol-based compound, and further includes at least one of a phosphorus-based compound and a sulfur-based compound.

11. The liquid crystal display of claim 10, wherein the nanophosphor includes a least one of a quantum dot and an inorganic phosphor.

12. The liquid crystal display of claim 10, wherein the nanophosphor is a quantum dot, and
the quantum dot includes a first quantum dot configured to emit red light and a second quantum dot configured to emit green light.

13. The liquid crystal display of claim 10, wherein the quantum dot tube further includes at least one of the photopolymerization compound, the photopolymerization initiator, and the dispersant.

14. The liquid crystal display of claim 10, wherein the quantum dot tube includes a thermal hardening resin.

15. The liquid crystal display of claim 10, wherein the light-emitting device includes a blue light emitting diode (LED).

16. The liquid crystal display of claim 10, further comprising
an optical sheet positioned between the light guide and the display panel.

17. The liquid crystal display of claim 10, wherein the display panel includes:
a liquid crystal panel, and
polarizers positioned on opposing surfaces of the liquid crystal panel.

18. The liquid crystal display of claim 17, wherein the liquid crystal panel includes:
a first substrate,
a transistor positioned on the first substrate,
a pixel electrode connected to the transistor,
a common electrode positioned to form an electric field along with the pixel electrode,
a second substrate facing the first substrate to be separated therefrom, and
a liquid crystal layer positioned between the first substrate and the second substrate.

19. A liquid crystal display comprising:
a display panel; and
a light assembly configured to provide light to the display panel;
wherein the light assembly includes:
a light-emitting device configured to emit first light;
a light guide positioned to receive the first light; and
a quantum dot sheet positioned on the light guide and positioned to receive the first light from the light guide, the quantum dot sheet configured to emit second light responsive to the received first light,
wherein the quantum dot sheet includes a nanophosphor and an antioxidant,
wherein the nanophosphor includes a core, a shell covering the core and a capping layer enclosing the shell and combined with the shell, and
wherein the antioxidant includes at least one compound selected from a group including a phenol-based compound, a phosphorus-based compound, and a sulfur-based compound.

* * * * *